(12) United States Patent
Majid et al.

(10) Patent No.: US 12,126,374 B2
(45) Date of Patent: Oct. 22, 2024

(54) SPREAD SPECTRUM COMMUNICATION, AND ASSOCIATED DEVICES, SYSTEMS, AND METHODS

(71) Applicant: Battelle Energy Alliance, LLC, Idaho Falls, ID (US)

(72) Inventors: Arslan J. Majid, Salt Lake City, UT (US); Hussein Moradi, Idaho Falls, ID (US); Behrouz Farhang, Salt Lake City, UT (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 28 days.

(21) Appl. No.: 17/645,220

(22) Filed: Dec. 20, 2021

(65) Prior Publication Data
US 2022/0116070 A1 Apr. 14, 2022

Related U.S. Application Data

(63) Continuation-in-part of application No. 17/249,593, filed on Mar. 5, 2021, now abandoned.

(60) Provisional application No. 63/130,513, filed on Dec. 24, 2020, provisional application No. 62/986,480, filed on Mar. 6, 2020.

(51) Int. Cl.
*H04B 1/7097* (2011.01)

(52) U.S. Cl.
CPC .................. *H04B 1/7097* (2013.01)

(58) Field of Classification Search
CPC .... H04B 1/7097; H04B 1/711; H04B 1/7073; H04B 2201/709709; H04J 13/0059; H04J 13/0062; H04J 13/0048; H04L 27/2607; H04W 72/12
See application file for complete search history.

(56) References Cited

U.S. PATENT DOCUMENTS

| | | |
|---|---|---|
| 6,563,881 B1 | 5/2003 | Sakoda et al. |
| 7,274,707 B2 | 9/2007 | Choi et al. |
| 7,738,540 B2 | 6/2010 | Yamasaki et al. |
| 7,929,409 B2 | 4/2011 | Chitrapu et al. |

(Continued)

FOREIGN PATENT DOCUMENTS

| | | | |
|---|---|---|---|
| CN | 108337675 A | * | 7/2018 |
| IN | 202037008209 A | | 5/2020 |

OTHER PUBLICATIONS

Li et al. (CN_108337675_A) English machine translation (Year: 2018).*
A. Mukherjee, S. A. A. Fakoorian, J. Huang and A. L. Swindlehurst, "Principles of Physical Layer Security in Multiuser Wireless Networks: A Survey," in IEEE Communications Surveys & Tutorials, vol. 16, No. 3, pp. 1550-1573, Third Quarter 2014 (Year: 2014).*

(Continued)

*Primary Examiner* — Sam K Ahn
*Assistant Examiner* — Amneet Singh
(74) *Attorney, Agent, or Firm* — TraskBritt

(57) ABSTRACT

Various embodiments relate to spread spectrum communication. A communication system may include a base station and a user equipment. The base station may be configured to: add a cyclic prefix (CP) to each block of a number of blocks of a first direct sequence spread spectrum (DSSS) signal to generate a first cyclic prefix-direct sequence spread spectrum (CP-DSSS) signal; add artificial noise to the first CP-DSSS signal; and transmit, via a channel, the first CP-DSSS signal. The user equipment is configured to receive the first CP-DSSS signal. Associated methods and communications systems are also disclosed.

19 Claims, 19 Drawing Sheets

(56) References Cited

U.S. PATENT DOCUMENTS

| | | | |
|---|---|---|---|
| 8,931,053 | B2 | 1/2015 | Wang |
| 9,215,587 | B2 | 12/2015 | Moradi et al. |
| 9,253,291 | B2 | 2/2016 | Tandra et al. |
| 10,263,662 | B2 | 4/2019 | Jiang |
| 2002/0126741 | A1 | 9/2002 | Baum et al. |
| 2002/0141518 | A1* | 10/2002 | Piirainen .......... H04L 25/03993 375/346 |
| 2004/0252779 | A1 | 12/2004 | Rouquette et al. |
| 2005/0105595 | A1* | 5/2005 | Martin ................. H04B 1/707 370/335 |
| 2006/0274817 | A1 | 12/2006 | Lakkis |
| 2007/0263744 | A1* | 11/2007 | Mostafa ............. H04B 7/0857 375/267 |
| 2009/0059882 | A1* | 3/2009 | Hwang ................ H04L 5/0021 370/342 |
| 2009/0271836 | A1 | 10/2009 | Maxson et al. |
| 2009/0279626 | A1 | 11/2009 | Wang |
| 2011/0007781 | A1 | 1/2011 | Camp et al. |
| 2011/0182329 | A1 | 7/2011 | Wehinger |
| 2015/0334704 | A1 | 11/2015 | Wei et al. |
| 2019/0089566 | A1 | 3/2019 | Li et al. |
| 2020/0028550 | A1 | 1/2020 | Manolakos et al. |
| 2020/0092748 | A1 | 3/2020 | Teyeb et al. |
| 2022/0109515 | A1* | 4/2022 | Chervyakov .......... H04B 17/21 |

OTHER PUBLICATIONS

Chin et al., "Authentication scheme for mobile OFDM based on security information technology of physical layer over time-variant and multipath fading channels," Information Sciences, vol. 321, (Feb. 15, 2015), pp. 238-249.

Liu et al., "A Two Dimensional Quantization Algorithm for CIR-Based Physical Layer Authentication," 2013 IEEE International Conference on Communications (ICC), (2013) pp. 4724-4728.

Liu et al., "Robust Physical Layer Authentication Using Inherent Properties of Channel Impulse Response," 2011—MILCOM 2011 Military Communications Conference, (2011) pp. 538-542.

Shan et al., "PHY-CRAM: Physical Layer Challenge-Response Authentication Mechanism for Wireless Networks," IEEE Journal on Selected Areas in Communications, vol. 31, Issue 9, (Sep. 2013) pp. 1817-1827.

Wang et al., "Continuous Physical Layer Authentication Using a Novel Adaptive OFDM System," 2011 IEEE International Conference on Communications (ICC), (2011) 5 pages.

A. Aminjavaheri, A. RezazadehReyhani, R. Khalona, H. Moradi and B. Farhang-Boroujeny, "Underlay Control Signaling for Ultra-Reliable Low-Latency IoT Communications," 2018 IEEE International Conference on Communications Workshops (ICC Workshops), 2018, pp. 1-6, doi: 10.1109/ICCW.2018.8403493. (Year: 2018).

\* cited by examiner

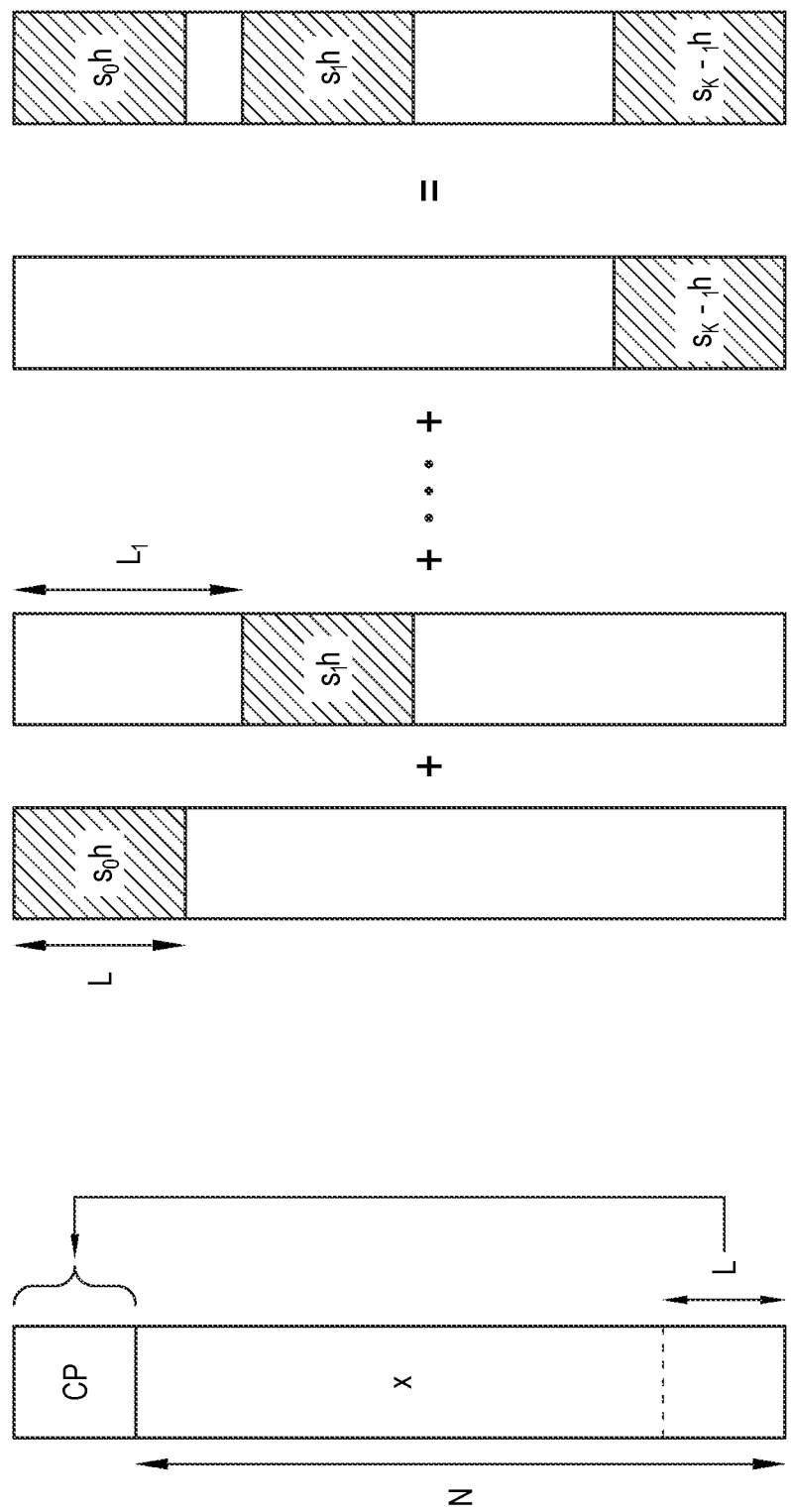

SPREAD SPECTRUM COMMUNICATION, AND ASSOCIATED DEVICES, SYSTEMS, AND METHODS

CROSS-REFERENCE TO RELATED APPLICATIONS

This application is a continuation-in-part of U.S. patent application Ser. No. 17/249,593, filed Mar. 5, 2021, which claims the benefit under 35 U.S.C. § 119(e) of U.S. Provisional Patent Application Ser. No. 62/986,480, filed Mar. 6, 2020, and this application also claims the benefit under 35 U.S.C. § 119(e) of U.S. Provisional Patent Application Ser. No. 63/130,513, filed Dec. 24, 2020, the disclosure of each of which is hereby incorporated herein in its entirety by this reference.

STATEMENT REGARDING FEDERALLY SPONSORED RESEARCH OR DEVELOPMENT

This invention was made with government support under Contract No. DE-AC07-05-ID14517 awarded by the United States Department of Energy. The government has certain rights in the invention.

FIELD

Embodiments of the present disclosure relate generally to wireless communication, and more specifically to spread spectrum modulation for communication in wireless networks. Yet more specifically, some embodiments relate to adding a cyclic prefix to a direct sequence spread spectrum signal. Further, some embodiments relate to communication systems including a primary network that includes a base station and its associated user equipment (UEs), and a secondary network of femtocells, wherein each femtocell may include a femtocell gateway (FGW) and a number of UEs. Moreover, some embodiments relate to enhancing security and/or authentication in wireless communication. More specifically, some embodiments relate to augmenting a cyclic prefix-direct sequence spread spectrum (CP-DSSS) signal with artificial noise prior to transmission of the CP-DSSS signal. Further, some embodiments relate to authenticating a received CP-DSSS signal based on at least one property of the received CP-DSSS signal.

BACKGROUND

Spread-spectrum (SS) techniques are often used to distribute wireless transmit signals over a wider bandwidth than a minimum required transmission bandwidth. In military applications, SS transmission may be used to avoid interference and also to reduce the probability of detection or interception. In civilian applications, some forms of SS transmission may be used to allow multiple users to share the same channel or spectrum. One technique referred to as direct sequence spread spectrum (DSSS), which may be used to reduce overall signal interference, makes a transmitted signal wider in bandwidth than an information bandwidth. After dispreading of the direct-sequence modulation (e.g., at a receiver), the information bandwidth is restored and interference (e.g., intentional and/or unintentional interference) may be reduced.

BRIEF SUMMARY

One or more embodiments of the present disclosure include a communication device including a processor and a receiver. The communication device may be configured to receive, via the receiver, a CP-DSSS signal. The communication device may further be configured to determine, via the processor, whether the CP-DSSS signal was transmitted from a legitimate device or a spoofing device based on at least one property of the CP-DSSS signal.

One or more other embodiments of the present disclosure include a method. The method may include receiving, at a base station, a cyclic prefix-direct sequence spread spectrum (CP-DSSS) signal. The method may also include determining, based on a matched filter signal level of the CP-DSSS signal, whether the CP-DSSS signal originated from a legitimate device or a spoofing device.

According to another embodiment, a method may include adding a CP to each block of a number of blocks of DSSS signal to generate a CP-DSSS signal. The method may also include adding artificial noise to the CP-DSSS signal. Further, the method may include transmitting the CP-DSSS signal.

Other embodiments may include a communication system. The communication system may include a base station. The base station may be configured to add a cyclic prefix (CP) to each block of a number of blocks of a DSSS signal to generate a CP-DSSS signal. The base station may also be configured to add artificial noise to the CP-DSSS signal. Further, the base station may be configured to transmit, via a channel, the CP-DSSS signal. The communication system may also include a user equipment configured to receive the CP-DSSS signal.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

FIG. 2 depicts an example cyclic prefix added to a column vector, according to various embodiments of the present disclosure;

FIG. 3 depicts an example construction of a received signal vector after dispreading, in accordance with various embodiments of the present disclosure;

DETAILED DESCRIPTION

Figure 1:
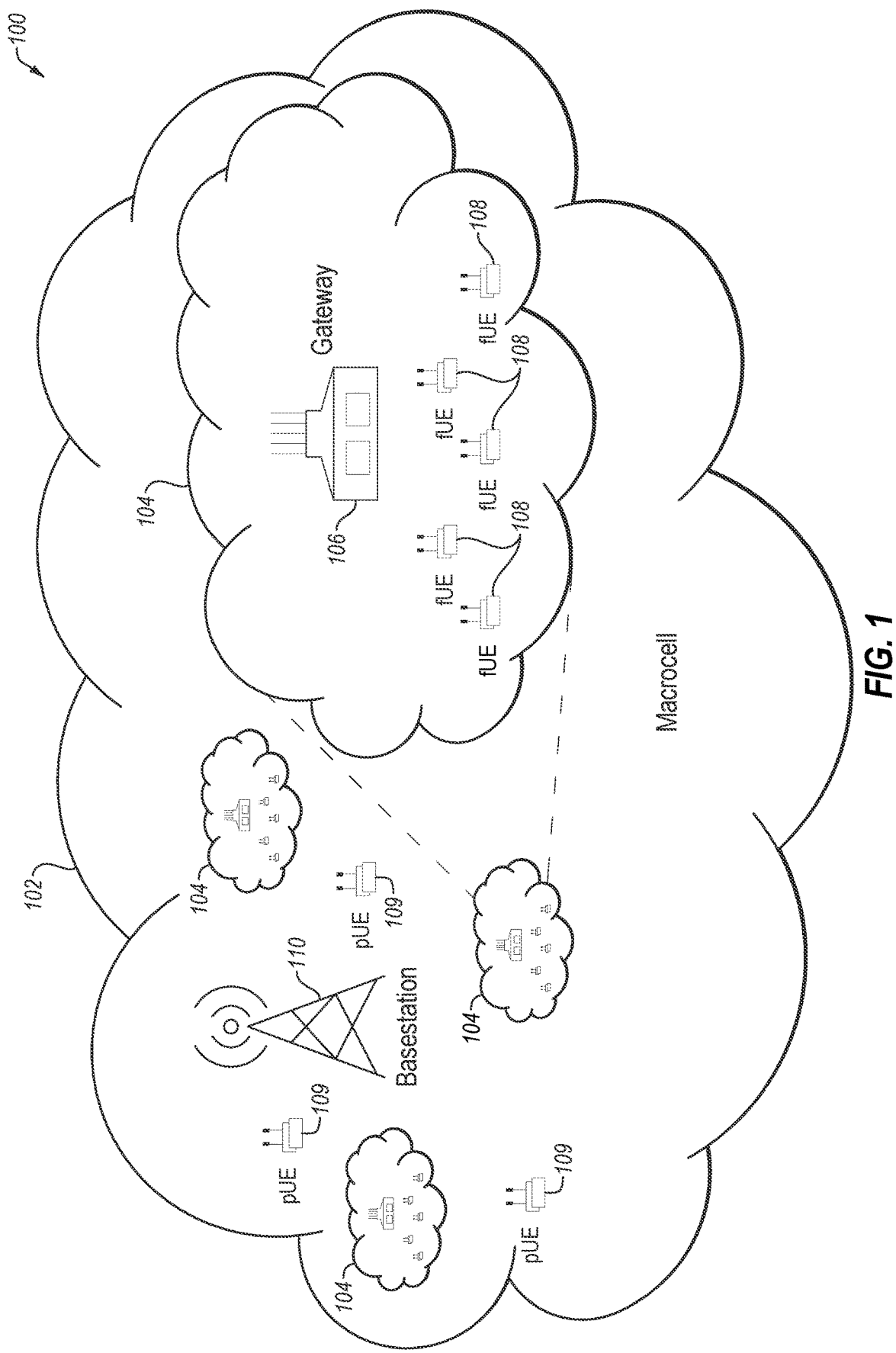
FIG. 1 illustrates an example communication system, according to various embodiments of the present disclosure.

In the following description, reference is made to the accompanying drawings in which are shown, by way of illustration, specific embodiments in which the disclosure may be practiced. The embodiments are intended to describe aspects of the disclosure in sufficient detail to enable those skilled in the art to make, use, and otherwise practice the invention. Furthermore, specific implementations shown and described are only examples and should not be construed as the only way to implement the present disclosure unless specified otherwise herein. It will be readily apparent to one of ordinary skill in the art that the various embodiments of the present disclosure may be practiced by numerous other partitioning solutions. Other embodiments may be utilized and changes may be made to the disclosed embodiments without departing from the scope of the disclosure. The following detailed description is not to be taken in a limiting sense, and the scope of the present invention is defined only by the appended claims.

In the following description, elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths, and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, e.g., a combination of a DSP and a microprocessor, a plurality of microprocessors, one or more microprocessors in conjunction with a DSP core, or any other such configuration.

Also, it is noted that embodiments may be described in terms of a process that may be depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media include both computer storage media and communication media, including any medium that facilitates transfer of a computer program from one place to another.

It should be understood that any reference to an element herein using a designation such as "first," "second," and so forth, does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

In the present disclosure, the term "spectrum" may refer to one or more resources for transmitting and receiving wireless data. For example, "spectrum" may refer to a frequency range that may be divided into frequency bands. As another example, "spectrum" may, additionally or alternatively, refer to a time duration that may be divided into time slots. As another example, "spectrum" may, additionally or alternatively, refer to sub-carriers that may be assigned to transmitters.

As will be appreciated, the number of wireless communication users throughout the world continues to increase. To decrease signal collisions in increasingly busy wireless communication networks, there is a continuous push to advance technologies to reduce signal power levels and/or reduce signaling overhead. Internet of things (IoT) applications, which rely heavily on wireless communication networks, may include devices, or at least clusters of devices that are in the vicinity of one another.

IoT applications may be categorized into two classes: (i) massive machine-type communications (mMTC) and (ii) ultra-reliable low-latency communications (URLLC). In mMTC wherein a large number of devices may need to communicate, emphasis is on low-cost, scalability, and long battery lifetime. Also, in mMTC, the exchanged data packets are relatively short in terms of the number of bits transmitted. On the other hand, URLLC relates to mission-critical applications where robust and low-latency exchange of information may be needed.

Various embodiments disclosed herein relate to a signaling method including packet construction and/or dispreading techniques for DSSS signals including a cyclic prefix (CP). Yet more specifically, various embodiments of the present disclosure relate to spread spectrum signaling (also referred to herein as "CP-DSSS signaling"), wherein a CP may be added to each block of a number of blocks of a direct sequence spread spectrum (DSSS) signal to generate a CP-DSSS signal. For example, a set of orthogonal vectors that are cyclically shifted versions of a spreading sequence (also referred to herein as a "root sequence") may be modulated before adding the CP to each block of the DSSS signal to generate the CP-DSSS signal.

In various embodiments, a signaling method may allow femtocell networks (also referred to herein as "femtocells") to serve clusters of devices (e.g., that may be located in confined and/or coverage-limited areas). According to some embodiments, a femtocell (i.e., including a cluster of devices) may co-exist within another network (e.g., a primary network; also referred to herein as a "macrocell") while sharing spectral resources (e.g., with the primary network) (i.e., the femtocell may not need a dedicated spectrum). In other words, according to some embodiments, a DSSS signal, including a CP, may be used within a femtocell network that may co-exist with other services (e.g., 5G services) within the primary network. Yet more specifically, adding a cyclic prefix to a DSSS signal may allow for communication in the same spectrum already in use by another network (e.g., a LTE network) with minimal interference due to, for example, the nature of spread spectrum, the inherent low power transmission of user equipment within a femtocell and also the femtocell base station, and/or by using multiple antennas to add an additional layer of processing gain at the femtocell base station.

According to some embodiments (e.g., to keep network cost low), each femtocell (e.g., within a macrocell) may be controlled by a base station (e.g., a low-cost base station), which may also be referred to herein as a "femtocell gateway" (FGW). Further, according to some embodiments, a femtocell may be configured to use existing synchronization downlink signals (e.g., from an existing LTE network) to time and/or frequency synchronize a FGW and one or more other devices (e.g., UEs). Time synchronization, in particular, may be possible considering that all nodes within a femtocell and a respective FGW may be confined within a relatively small physical space (e.g., within a diameter of 100 meters).

Further, according to some embodiments, a root sequence and circularly shifted versions of the root sequence may be used to carry information symbols, and thus signal transmissions at different rates may be possible. Low data rates may allow for signal levels to be kept at a sub-noise level, which may allow for the use of a femtocell as an underlay network (e.g., similar to an ultra-wideband (UWB) system/network).

Moreover, according to some embodiments, a FGW may include multiple antennas, which may increase processing gain that may allow for transmission of underlay signals at reduced levels. Thus, interference in a network may be reduced. Further, the presence of multiple antennas at a FGW may provide for signal separation in the uplink channel, and precoding of downlink signals (i.e., for focusing the signals on the respective user antennas) may enable for construction of a multiple access network.

Further, according to various embodiments, as described more fully below, a CP-DSSS signal may be augmented with artificial noise to, for example, increase the likelihood of a signal (e.g., a downlink signal) being detected only by an intended device (i.e., a device for which the signal has been transmitted). In these embodiments, the security and/or confidentiality of a transmitted message may be enhanced and/or preserved.

Further, as described more fully below, according to various embodiments, a device (e.g., a FGW/base station or another device) may authenticate a received CP-DSSS signal based on at least one property (e.g., characteristic) of the received CP-DSSS signal. More specifically, according to some embodiments, a device may use a channel impulse response of a received CP-DSSS signal (e.g., an embedded piece of information in the received CP-DSSS signal) to authenticate the received CP-DSSS signal. Further, according to some embodiments, a device may use a signal level of a matched filter signal of a received CP-DSSS signal to authenticate the received CP-DSSS signal. In these embodiments, a device (e.g., a base station) may be able to determine whether a received CP-DSSS signal was transmitted by a legitimate device (e.g., a legitimate user equipment (UE)) or a spoofing device (e.g., a bad actor, intruder, etc.). As will be appreciated, the signaling techniques and device and/or system configurations described herein may have many wireless communication applications, including, but not limited to, IoT applications. Embodiments of the present disclosure will now be explained with reference to the accompanying drawings.

FIG. 1 illustrates an example communication system 100, in accordance with one or more embodiments of the present disclosure. Communication system 100 includes a network (also referred to herein as a "primary network") 102 including a number of femtocells (also referred to herein as "secondary networks") 104, wherein each femtocell 104 may include a femtocell gateway (FGW) 106 and a number of femtocell user equipment (fUEs) 108. Network 102 may further include a base station (e.g., an LTE base station) 110 and additional primary network user equipment (pUEs) 109 that may not be part of a femtocell. According to various embodiments, network 102, which may also be referred to herein as a "macrocell," may include, for example only, an LTE network. To distinguish between UEs that belong to a femtocell and those that belong to the primary network, the prefixes "f" and "p" are added; accordingly, namely fUE refers to UE within femtocell 104, and pUE refers to a UE within primary network 102.

As will be described more fully below, various devices of communication system 100 (e.g., fUEs 108, FGW 106, or other devices) may be configured for packet construction (also referred to herein as "signal modulation") such that a CP is added to each block of a DSSS signal to generate a CP-DSSS signal. The devices may further be configured to transmit the CP-DSSS signal (e.g., via a channel) to another device (e.g., within an associated femtocell 104). Further, as also described more fully below, various devices of communication system 100 (e.g., fUEs 108, FGW 106, or other devices) may be configured to receive a CP-DSSS signal at a receiver, remove the CP from each block of the number of blocks of the CP-DSSS signal to generate a received signal vector, dispread the received signal vector, and extract information from the dispread received signal vector.

In accordance with various embodiments, CP-DSSS signaling may allow for data transmissions at different rates. For example, in cases wherein a required data rate is low, CP-DSSS signaling may allow for substantial processing gain, and thus, a transmitted CP-DSSS signal may remain below a noise level and, therefore, the CP-DSSS signal may co-exist as an underlay signal along with other communications signals in network 102, which may include, for example, an overlay LTE macrocell. Accordingly, the same spectrum (i.e., spectral resources) may be reused in multiple femtocells 104 that co-exist within network 102. Further, because most, if not all, devices (e.g., FGW 106 and fUEs 108) within each femtocell 104 may be positioned within a relatively small physical space (e.g., a diameter of 100 meters), the co-existence of, for example, IoT communications and an LTE network within the same spectrum/carrier may be possible.

Further reduction of signal levels within femtocell 104 may be possible by installing multiple antennas (e.g., 64, 128, 192, without limitation) at FGW 106. Multiple antennas at FGW 106 may introduce an additional processing gain that may be used to further reduce the power of a transmitted signal (e.g., within femtocell 104) to an arbitrarily low level by increasing the number of antennas at FGW 106. The presence of multiple antennas at FGW 106 may also allow for a multi-user setup where nodes (e.g., UEs 108, FGW 106, without limitation) within each femtocell 104 may transmit and receive simultaneously.

Embodiments related to CP-DSSS packet construction will now be described. For example, CP-DSSS packet construction may be performed by a device (e.g., fUE 108 of FIG. 1) a FGW (e.g., FGW 106 of FIG. 1), or other devices. According to various embodiments, each information symbol of a number of information symbols may be spread over a spreading sequence of length N, and a collection of data symbols (also referred to as a "frame") may be transmitted (e.g., via a fUE 108 or FGW 106 of FIG. 1) simultaneously using the same spreading sequence. The spreading sequence, which may be referred to as a "root sequence," is denoted by the following column vector:

$$z_0 = \begin{bmatrix} z_0 \\ z_1 \\ z_2 \\ \vdots \\ z_{N-1} \end{bmatrix}. \tag{1}$$

Further, circularly shifted versions of column vector $z_0$ may be defined as:

$$z_1 = \begin{bmatrix} z_{N-1} \\ z_0 \\ z_1 \\ \vdots \\ z_{N-2} \end{bmatrix}, \tag{2}$$

$$z_2 = \begin{bmatrix} z_{N-2} \\ z_{N-1} \\ z_0 \\ \vdots \\ z_{N-3} \end{bmatrix}, \cdots,$$

$$z_{N-1} = \begin{bmatrix} z_1 \\ z_2 \\ z_3 \\ \vdots \\ z_0 \end{bmatrix}.$$

As shown in equations (1) and (2), a bottom element of one version of the column vector is shifted to a top of a subsequent version of the column vector. More specifically, for example, in equation (1) (i.e., for version $Z_0$), $Z_{N-1}$ is positioned at the bottom (also referred to as a "trailing edge") of the column vector, and in equation (2) (i.e., for version $Z_1$), $Z_{N-1}$ is positioned at the top (i.e., the beginning) of the column vector. Similarly, for version $Z_1$, $Z_{N-2}$ is positioned at the bottom of the column vector, and for version $Z_2$, $Z_{N-2}$ is positioned at the top (i.e., the beginning) of the column vector. Moreover, a data frame that carries a set of K data symbols $S_0, S_1, \ldots, S_{K-1}$ may be provided as:

$$x = \sum_{k=0}^{K-1} s_k z_{kL_1}; \tag{3}$$

wherein $$L_1 = \left\lfloor \frac{N}{K} \right\rfloor,$$

where $\lfloor \cdot \rfloor$ refers to the integer part of.

It is noted that in equation (3), K symbols are used, rather than N (e.g., see equations (1) and (2)). In some embodiments, K<N (e.g., N=10K) such that the spreading of data may be diluted. In other words, increasing the value of $L_1$ may result in more widely spaced data symbols (e.g., after dispreading) and thus, inter-symbol interference (ISI) may be reduced and a signal-to-interference ratio may be increased.

According to various embodiments, a cyclic prefix (CP) may be added to column vector x (i.e., prior to transmission of a signal). For example, FIG. 2 illustrates a CP of length L added to column vector x of length N. More specifically, as shown in FIG. 2, a sample at the bottom ("trailing edge") of column vector x is repeated at the top (i.e., the beginning) of column vector x. The addition of CP to a DSSS signal may allow the resulting CP-DSSS signal to appear as a periodic signal (i.e., to a receiver), wherein length L should be longer than a length of a channel impulse response (i.e., to absorb the transient of the channel). The addition of a CP may result in a circular convolution of column vector x with a channel impulse response once the CP is removed from a received signal.

After a signal (i.e., column vector x including a CP) passes through a channel (e.g., an uplink or a downlink channel) of a network (e.g., femtocell 104), the signal may be received at a receiver (e.g., FGW 106 of FIG. 1) and the CP may be removed from the received signal resulting in the following received signal vector:

$$y = \left(\sum_{k=0}^{K-1} s_k Z_{kL_1}\right) h + v; \qquad (4)$$

wherein h is the L×1 vector of the channel impulse response, $Z_{kL_1}$ is an N×L circulant matrix with a first column of $z_{kL_1}$, and v is the vector of noise plus interference (i.e., from other communications in the network).

According to one non-limiting example, root sequence $z_0$ (see equation (1)) may include a root sequence of a class of Zadoff-Chu (ZC) sequences. The general formula for the class of ZC sequences of length N is:

$$x_u(n) = \frac{1}{\sqrt{N}} \exp\left(-j\frac{\pi u n(n+c)}{N}\right), \qquad (5)$$

$$n = 0, 1, 2, \cdots, N-1;$$

wherein c=0 when N is even and c=1 when N is odd. The parameter u, which is a prime integer with respect to N, is the sequence index. ZC sequences of different indices may not be orthogonal, but may exhibit a relatively small correlation.

For a given length N and a valid choice of parameter u, root-ZC sequence $z_0$ has elements $\{x_u(n), n=0, 1, 2, \ldots, N-1\}$ and satisfies the following properties:

$$z_i^H z_j = \begin{cases} 1, & i = j \\ 0, & i \neq j \end{cases} \qquad (6)$$

It is noted that $z_i^H z_j = 1$ due to the normalization factor $$\frac{1}{\sqrt{N}}$$

on the right-hand side of equation (5). Equation (6) may also be written as:

$$z_i^H z_j = \delta_{i,j}; \qquad (7)$$

wherein the superscript H denotes Hermitian and $\delta_{i,j}$ is the Kronecker delta function.

Equation (7) is often referred to as "zero-autocorrelation property." Besides the ZC sequence, there are many other sequences that satisfy the zero-autocorrelation property and thus any suitable sequence may be used for construction of a CP-DSSS signal. For example, as will be appreciated by a person having ordinary skill in the art, any time-domain sequence whose discrete Fourier transform (DFT) has a constant amplitude may satisfy the zero-autocorrelation property. More specifically, a time-domain sequence may be generated by executing the following code: z=ifft(exp (1i*2*pi*rand(N, 1))); wherein 1i=$\sqrt{-1}$, pi=$\pi$, and rand(N,1) generates a vector of N random numbers uniformly distributed in the range 0 to 1. Hence, exp(1i*2*pi*rand(N, 1)) is vector of length N with complex entries with constant magnitude of unity. Since there are infinite choices for rand(N, 1), infinite length-N sequences exist that satisfy the zero-autocorrelation property. In at least some embodiments, the ZC sequences may be suitable due to ZC sequences having constant magnitude in both the time-domain and in the frequency-domain.

Further, for i and j in the range of 0 to N−1 and L<N, a pair of N×L circulant matrices may be defined as:

$$Z_i = [z_i z_{i+1} \ldots z_{i+L-1}]; \qquad (8)$$

and $$Z_j = [z_j z_{j+1} \ldots z_{j+L-1}]; \qquad (9)$$

wherein equation (7) implies that when |i−j|≥L:

$$Z_i^H Z_j = 0; \qquad (10)$$

and for i=j:

$$Z_i^H Z_j = I; \qquad (11)$$

wherein 0 and I are zero and identity matrices of proper size.

As will be appreciated, when |i−j|<L, $Z_i^H Z_j$ is a diagonal matrix with "zeros" at its first |i−j| diagonal element and "ones" at its remaining diagonal elements.

The set of N column vectors $z_0, z_1, \ldots, z_{N-1}$ may be defined as $Z=\{z_0, z_1, \ldots, z_{N-1}\}$. Further, an N×N circulant matrix may be defined as:

$$Z = [z_0 z_1 \ldots z_{N-1}]; \qquad (12)$$

wherein Z may be an orthonormal matrix (i.e., $Z^H Z = I$), following equation (7).

Various embodiments related to signal dispreading (e.g., at a receiver) will now be described. To detect data symbols and, thus, recover transmitted information from a received signal vector y, y of equation (4) may be multiplied by the Hermitian of orthonormal matrix Z to provide the following dispread signal vector:

$$\tilde{y} = Z^H y = \sum_{k=0}^{K-1} s_k (Z^H Z_{kL_1}) h + \tilde{v}; \qquad (13)$$

wherein $\tilde{v} = Z^H v$.

Two cases (i.e., $L_1 \geq L$ and $L_1 < L$) may be treated separately. In a first case wherein $L_1 \geq L$, the summation on the right-hand side of equation (13) may be reduced to a column vector with segments $s_0 h, s_1 h, \ldots, s_{K-1} h$, each appended with $L_1 - L$ zeros, as depicted in FIG. 3. In a second case wherein $L_1 < L$, the summation on the right-hand side of equation (13) may be reduced to a column vector in which the segments $s_0 h, s_1 h, \ldots, s_{K-1} h$ overlap and add together, as depicted in FIG. 4.

In the first case (i.e., where $L_1 \geq L$), the data symbols may be separated from one another, and thus, there may be no inter-symbol interference (ISI). However, in the second case (i.e., where $L_1 < L$), overlapping of the segments $s_0 h$, $s_1 h, \ldots, s_{K-1} h$ may result in some ISI.

Figures 4, 5:
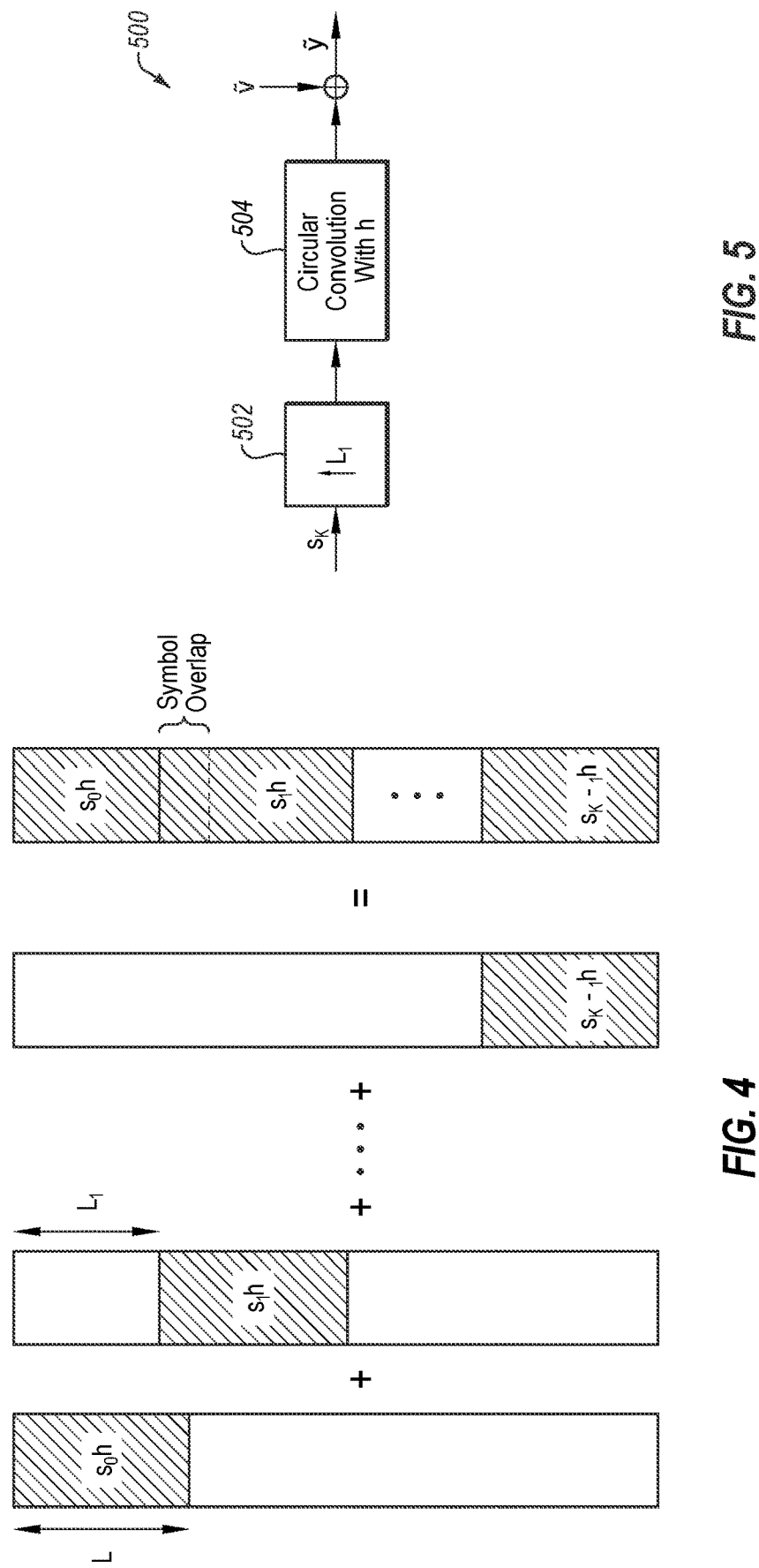
FIG. 4 depicts another example construction of a received signal vector after dispreading, in accordance with various embodiments of the present disclosure.
FIG. 5 depicts an example channel model, according to various embodiments of the present disclosure.

A system model 500 including parameter $L_1$ at a block 502 and a circular convolution block 504, in accordance with various embodiments, is shown in FIG. 5. Including spreading (i.e., at a transmitter) and dispreading (i.e., at a receiver) as parts of a channel, system model 500 may be used for modeling a CP-DSSS channel. Further, according to various embodiments, system model 500 may also be used for detection of transmitted information.

As shown in FIG. 5, a transmitted information symbol vector s (i.e., as provided in equation (14)):

$$s = [s_0 s_1 \ldots s_{K-1}]^T \tag{14}$$

is related to the received and dispread signal vector $\tilde{y}$ via the following equation:

$$\tilde{y} = Hs + \tilde{v}; \tag{15}$$

wherein H is an N×K matrix with a first column h, appended with a sufficient number of zeros to be extended to the length of N, and each subsequent column of H is generated by circularly shifting (i.e., via circular convolution block 504) the previous column by $L_1$ elements.

Figure 6:
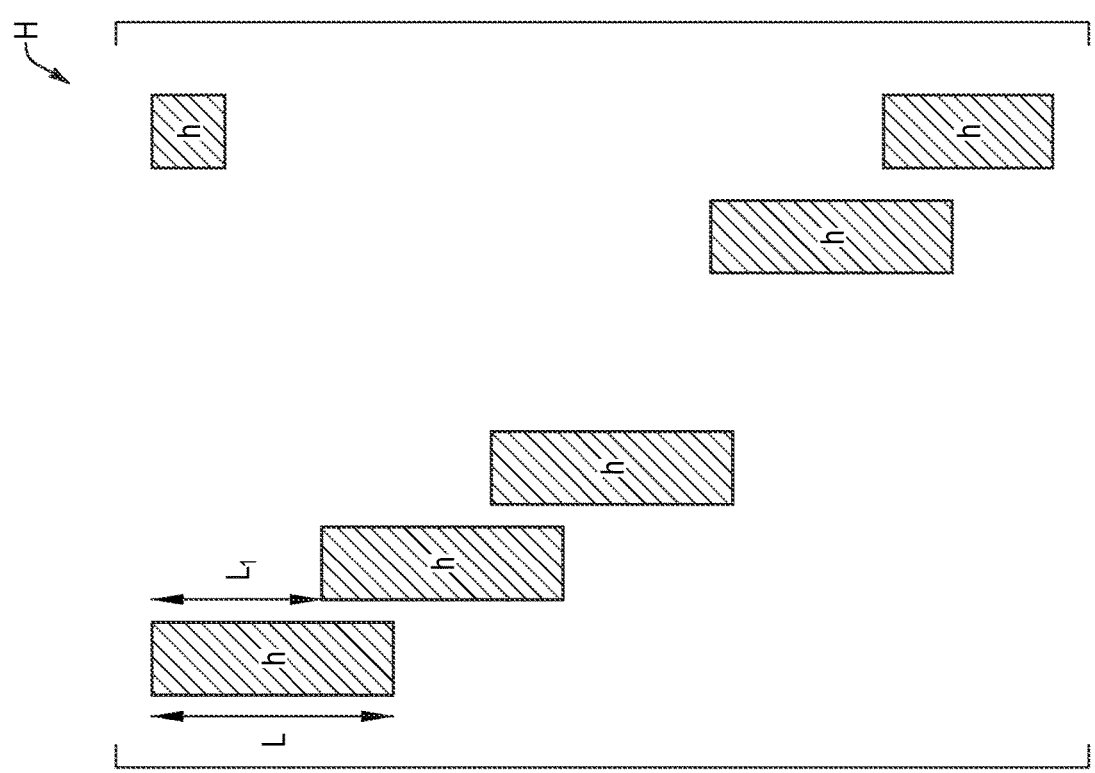
FIG. 6 illustrates an example matrix including a number of columns, according to various embodiments of the present disclosure.

FIG. 6 depicts a matrix H including columns h, wherein $L_1 < L$. As shown in FIG. 6, a portion of the last column h (i.e., on the right side of FIG. 6) has been truncated from an end (i.e., bottom, right side of FIG. 6) and has been copied to a top (i.e., top, right side of FIG. 6). The white space of FIG. 6 includes zeros (i.e., due to the circular convolution as shown in FIG. 5).

Certain choices of parameter $L_1$ may add additional properties to matrix H that may become relevant in the implementation of detectors, as described more fully below. When N is divisible by $L_1$, the last column of H after an $L_1$ circular shift becomes its first column. In this case, the matrices $H^H H$ and $$H^H H + \frac{\sigma_v^2}{\sigma_s^2} I$$

that are introduced below may be circulant matrices. Circulant matrices, as well known in the art, may have certain properties that may be used for more efficient implementation of certain systems. For example, the inverse of a circulant matrix may be obtained through application of a fast Fourier transform (FFT) to a first column of the circulant matrix, inverting of the resulting elements, and then applying an inverse fast Fourier transform (IFFT) to obtain the first column of the desired matrix, which is also circulant.

In equation (15), $\tilde{y}$ is an observation vector that may be used to estimate information symbol vector s. Known information includes H (as it is assumed that h is known) and that the elements of $\tilde{v}$ are uncorrelated and have the known variance of $\sigma_v^2$. A variety of detectors may be used for extraction of the information content of $\tilde{y}$. For example, one or more of the following detectors may be used:

1) A matched filter (MF) detector wherein:

$$\hat{s} = D^{-1} H^H \tilde{y} \text{ and } D = \text{diag}(H^H H); \tag{16}$$

2) A zero-forcing (ZF) detector wherein:

$$\hat{s} = (H^H H)^{-1} H^H \tilde{y}; \tag{17}$$

3) A minimum mean square error (MMSE) detector wherein:

$$\hat{s} = \left( H^H H + \frac{\sigma_v^2}{\sigma_s^2} I \right)^{-1} H^H \tilde{y}; \text{ and} \tag{18}$$

4) A soft detector that extracts log-likelihood ratio (LLR) values of the transmitted coded bits (i.e., starting with equation (15)).

It is noted that any of the above detectors and other detectors for data detection that follow linear equation (15) are applicable to detection of information that has been transmitted via CP-DSSS modulation.

Multi-user application of CP-DSSS signaling will now be described. The embodiments described above may be applicable with time division multiplexing (TDM) among different users. That is, in some embodiments, at a given time only one device (e.g., a user equipment (UE)) transmits and/or receives a CP-DSSS signal. However, embodiments of the present disclosure are not so limited, and various embodiments may provide for simultaneous transmission of CP-DSSS signals by two or more devices (e.g., fUEs or FGWs).

For example, two fUEs may transmit their respective CP-DSSS signals over the same spectrum and in a time synchronized manner (i.e., space division multiplexing (SDM)). In this example, the received signal, after dispreading, may be:

$$\tilde{y} = H_1 s_1 + H_2 s_2 + \tilde{v} = [H_1 \ H_2] \begin{bmatrix} s_1 \\ s_2 \end{bmatrix} + \tilde{v}; \tag{19}$$

wherein $s_1$ and $s_2$ are symbol vectors transmitted by the first and second fUE, respectively, and $H_1$ and $H_2$ are the respective channel matrices. It is noted that $H_1$ and $H_2$ have similar form to matrix H shown in FIG. 6.

Figure 7:
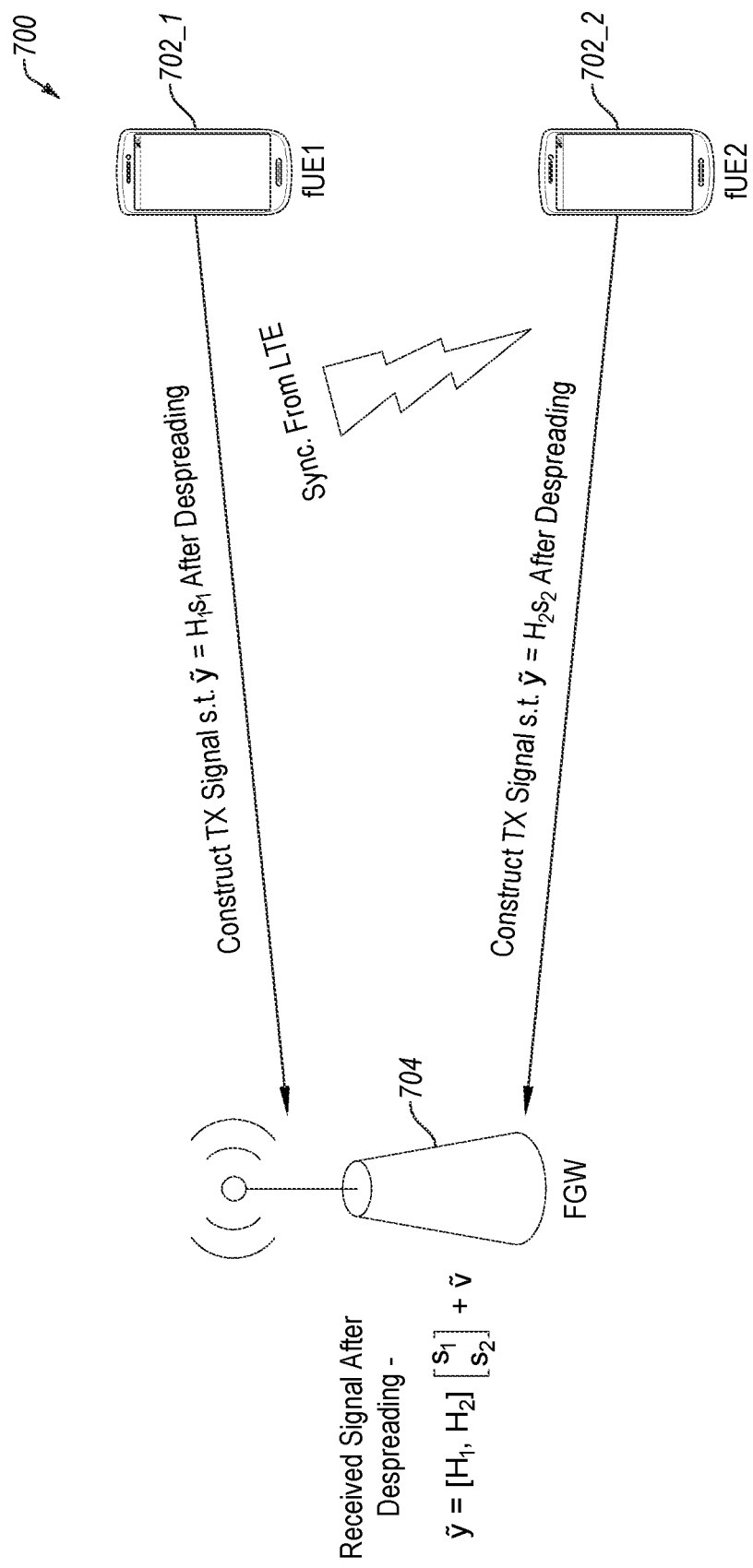
FIG. 7 illustrates a multi-user network, in accordance with various embodiments of the present disclosure.

It is noted that equation (19) has the same form as equation (15) and the detectors mentioned above may be used in multi-user embodiments. However, assuming that symbol vectors $s_1$ and $s_2$ are of the same length as s in equation (15), some performance loss may occur in estimating $s_1$ and $s_2$ as compared to an estimate of s in equation (15). FIG. 7 illustrates an example multi-user CP-DSSS network 700 including two fUEs 702_1 and 702_2 transmitting uplink signals simultaneously to a FGW 704.

While equation (15) may be applicable to both uplink and downlink transmission, equation (19) may be used for uplink transmission. When more than one fUE is being served simultaneously in downlink transmissions, a precoder may be applied to separate signals that correspond to different fUEs. For instance, a zero-forcing precoder may be implemented. For example, to transmit a symbol vector $s_1$ from FGW 704 to fUE1 702_1, the symbol vector $s_1$ may be modified through a pre-coding matrix $A_1$, wherein $A_1$ may be selected such that:

$$H_2 A_1 = 0. \tag{20}$$

This may assure that symbol vector $s_1$, after traveling through the channel, may be nulled at fUE2 702_2. It is noted that the received signal at fUE1 702_1, after dispreading, may be $H_1 A_1 s_1$ plus channel noise. Hence, additional constraints may be added to select $A_1$ such that $H_1 A_1$ may have a proper structure for detection of the information symbols/bits. For example, maximizing the sparsity of $H_1 A_1$ may be considered.

Similarly, to transmit a symbol vector $s_2$ from FGW 704 to fUE2 702_2, the symbol vector $s_2$ may be modified through a pre-coding matrix $A_2$, wherein $A_2$ may be selected such that:

$$H_1 A_2 = 0. \tag{21}$$

Figure 8:
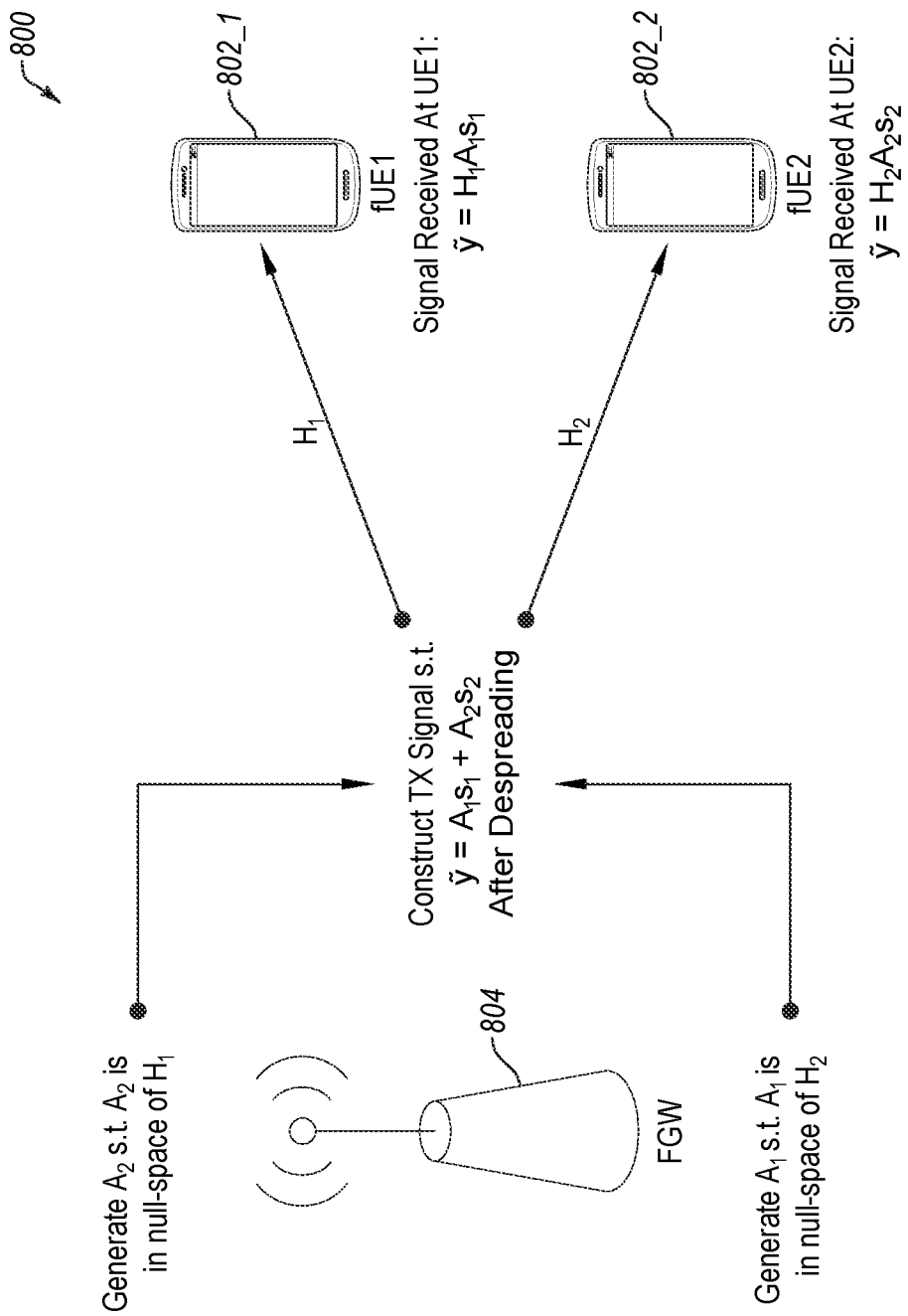
FIG. 8 illustrates another multi-user network, according to various embodiments of the present disclosure.

FIG. 8 illustrates another example of multi-user CP-DSSS network 800 including fUEs 802_1 and 802_2 and a FGW 804. In this embodiment, FGW 804 is transmitting downlink information simultaneously to fUE1 802_1 and fUE2 802_2.

Frequency division multiplexing (FDM) may allow for separation of multi-users when a number of UEs transmit/receive simultaneously. For example, when two fUEs transmit/receive simultaneously, the transmission band may be divided into two parts, and each part may be used by one fUE. In this example, equations (22) and (23) may be used at the receiver side, after dispreading:

$$\tilde{y}_1 = H_1 s_1 + \tilde{v}_1; \tag{22}$$

and $$\tilde{y}_2 = H_2 s_2 + \tilde{v}_2. \tag{23}$$

Equations (22) and (23), which are applicable to both uplink and downlink channels, are independent equations and independent detectors may be designed and used. Furthermore, generalization of these results to more than two UEs is within the scope of this disclosure.

Each of the multi-users methods (SDM and FDM) described above have advantages and disadvantages. For SDM, since power for each user is spread over the full available spectrum, the full processing gain can be realized. However, there may be some multi-user interference. For FDM, on the other hand, there may be no multi-user interference, but the processing gain is smaller. Selection of FDM versus SDM may depend on channel conditions, which may be evaluated prior to selection of either FDM or SDM.

Although various embodiments described above relate to use of a single antenna at a FGW (e.g., FGW 106 of FIG. 1), the present disclosure is not so limited, and according to various embodiments, a FGW may include multiple antennas (e.g., 64 antennas, 128 antennas, 192 antennas, or any other number of antennas). Various embodiments related to a FGM with multiple antennas will now be described.

In embodiments including multiple antennas at a FGW (e.g., FGW 106 of FIG. 1) of a femtocell (e.g., femtocell 104 of FIG. 1), for the case of uplink transmission, equation (15) may be applicable, with the following replacements:

$$\tilde{y} = \begin{bmatrix} \tilde{y}^{(1)} \\ \tilde{y}^{(2)} \\ \vdots \\ \tilde{y}^{(M)} \end{bmatrix}, \tag{24}$$

$$H = \begin{bmatrix} H^{(1)} \\ H^{(2)} \\ \vdots \\ H^{(M)} \end{bmatrix},$$

$$\tilde{v} = \begin{bmatrix} \tilde{v}^{(1)} \\ \tilde{v}^{(2)} \\ \vdots \\ \tilde{v}^{(M)} \end{bmatrix};$$

wherein M is the number of antennas at the FGW, $\tilde{y}^{(1)}$ through $\tilde{y}^{(M)}$ are the received signal vectors at the respective antennas, $H^{(1)}$ through $H^{(M)}$ are channel gain matrices, and $\tilde{v}^{(1)}$ through $\tilde{v}^{(M)}$ are the respective channel noise vectors.

The presence of multiple antennas at a FGW may result in a larger processing gain. Hence, transmission powers may be reduced, proportionately. This, in turn, may reduce interference that secondary users (e.g., within a femtocell) may introduce to primary users in a network (e.g., an LTE network).

Furthermore, multiple antennas at each FGW may enable multi-user CP-DSSS. Moreover, longer columns in the H matrix (see equation (24)) may provide more degrees of freedom for multi-user detectors as well as precoders that direct the signals of different users. In one example, two fUEs may send their respective data to a FGW. In this example, equation (19) may be modified to provide:

$$\tilde{y} = \begin{bmatrix} H_1^{(1)} & H_2^{(2)} \\ H_1^{(2)} & H_2^{(2)} \\ \vdots & \vdots \\ H_1^{(M)} & H_2^{(M)} \end{bmatrix} \begin{bmatrix} S_1 \\ S_2 \end{bmatrix} + \tilde{v}; \tag{25}$$

wherein $\tilde{y}$ and $\tilde{v}$ are defined in equation (24) above.

Equation (25) is similar to equation (15), and the detectors mentioned above may also be used in embodiments including multiple antennas.

On one hand, the presence of more data symbols (i.e., symbol vectors $s_1$ and $s_2$) may introduce some restrictions to a detector that may lead to some performance loss, compared to the case when only one UE transmits. On the other hand, the presence of multiple antennas may extend the length of columns of the respective channel matrix, and as a result, may provide more degrees of freedom for an improved detection of the received information.

In some embodiments, a number of antennas (i.e., parameter M) at a FGW is a large number (e.g., 128, 192, or more) or may tend to infinity. For example, in equation (25), wherein M is selected to be a large number, a "massive" multiple-input multiple-output (MIMO) femtocell scenario may exist. Assuming that the submatrices $H_1^{(1)}$ through $H_1^{(M)}$ and $H_2^{(1)}$ through $H_2^{(M)}$ are independent, the columns of the channel matrix shown in equation (26) may be a set of orthogonal vectors.

$$H = \begin{bmatrix} H_1^{(1)} & H_2^{(2)} \\ H_1^{(2)} & H_2^{(2)} \\ \vdots & \vdots \\ H_1^{(M)} & H_2^{(M)} \end{bmatrix}. \tag{26}$$

In this example, a matched filter (MF) detector (e.g., see equation (16)) may be used. In this example, the detector may use (e.g., include) a set of time reversal matched filters. In some embodiments, a MF detector may be used in a massive MIMO scenario. In this example:

$$\hat{s} = D^{-1} H^H \tilde{y} = (\text{diag}(H^H H))^{-1} \left( (H^H H) \begin{bmatrix} S_1 \\ S_2 \end{bmatrix} + H^H \tilde{v} \right). \tag{27}$$

When parameter M is very large (e.g., tends to infinity), coefficient matrix ($H^H H$) may approximately be a diagonal matrix. With a very large number of antennas at a FGW, even in a low SNR scenario, ŝ may provide an accurate estimate of symbol vectors $s_1$ and $s_2$.

In some embodiments wherein the number of antennas at an FGW is large (e.g., 64 or less), but not sufficiently large for coefficient matrix ($H^H H$) to be sufficiently diagonal, a MF detector may not perform sufficiently well. Under this condition, other detectors, such as ZF and/or MMSE detectors may be used. As noted above, the present disclosure is not limited to any specific detector, and a variety of the detectors disclosed herein and other detectors may be used in CP-DSSS modulation.

For downlink transmission, the embodiments described above using FDM in multi-user CP-DSSS and/or SDM in multi-user CP-DSSS may be extended to embodiments including multiple antennas at the FGW. Further, other known and suitable precoding options for MIMO and massive MIMO systems are also within the scope of this disclosure.

Embodiments relating to per-tone signal processing will now be described. According to at least some embodiments, the presence of a CP in a CP-DSSS signal may enable some (e.g., a majority) of signal processing tasks to be performed in the frequency domain in a per-tone manner. This may simplify signal detection at a receiver.

As will be appreciated by a person having ordinary skill in the art, the presence of CP may cause each CD-DSSS signal frame to appear periodic to a channel. Moreover, each transmit signal frame x (i.e., before the addition of CP) may be expressed by its DFT (denoted by xf). It is noted that the elements of xf are effectively the Fourier series coefficient of the underlying periodic signal (i.e., the periodic signal generated by periodic repetition of the frame vector x). In addition, the received signal vector y, after removing the CP, has the DFT of yf, and the individual elements of yf may be determined by multiplying the individual elements of xf with the elements of DFT of the channel impulse response. Accordingly, the channel distortion may be removed from the received frequency domain signal yf by dividing elements of the received frequency domain signal yf with the elements of the DFT of the channel impulse response. Also, matched filtering with the channel impulse response may be performed by element-wise multiplication of yf with the DFT of the channel impulse response. These ideas may be extended to more complex signal detections, for instance, when signals from multiple antennas are combined to achieve some optimality for information recovery.

As described herein, various embodiments relate to devices, systems, and methods for spread spectrum signaling. Various embodiments may include use of CP-DSSS signaling in a femtocell that may co-exist within a network (e.g., an LTE network), while using the same spectrum. In various embodiments, a CP-DSSS signal may have the same signal frame length to that of OFDM symbols in the network. Further, as described herein, a CP may be added to each frame (e.g., similar to a CP being added to each OFDM symbol frame). By doing so, downlink synchronization signals (e.g., LTE downlink synchronization signals) may be used to synchronize one or more fUEs and a FGW within a network (e.g., femtocell) (e.g., to allow for efficient operation of the network).

Further, by using a root sequence (e.g., a Zadoff-Chu (ZC) root sequence) and circularly shifted versions of the root sequence to carry information symbols, signal transmissions at different rates may be possible. Keeping data rates low (e.g., sufficient for massive machine type communications which the femtocells may be designed for), may allow signal levels to be kept at a sub-noise level, which may allow for the use of a femtocell as an underlay network, somewhat similar to an ultra-wideband (UWB) system/network.

Moreover, multiple antennas at a FGW of a femtocell may provide additional processing gain that in turn may allow for transmission of underlay signals at a reduced level, and thus interference in a network may be reduced. Further, the presence of multiple antennas at a FGW may provide for signal separation at the FGW in the uplink channel, and precoding of downlink signals (i.e., for focusing the signals on the respective user antennas) may enable for construction of a multiple access network.

Figure 9:
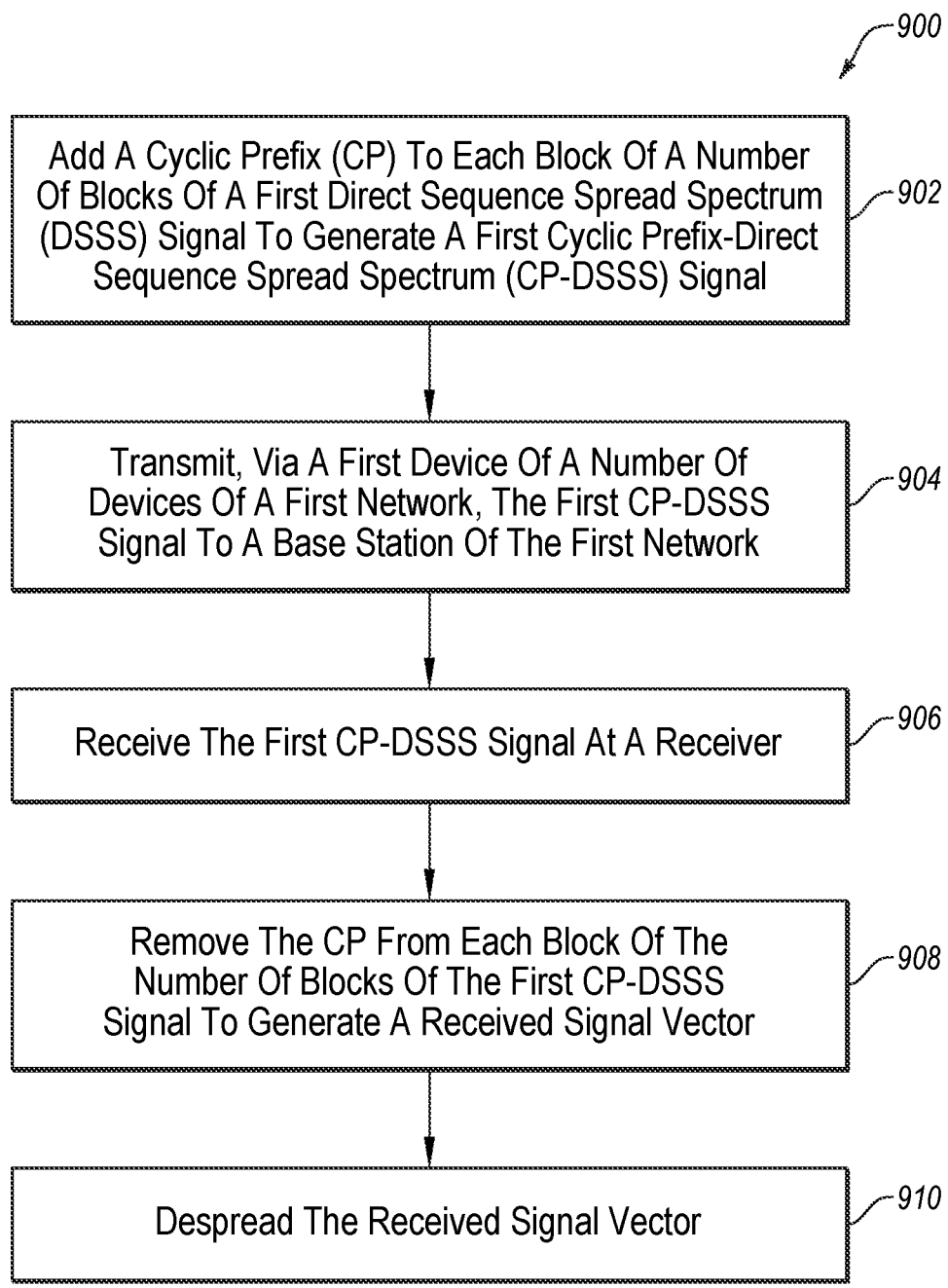
FIG. 9 is a flowchart of an example method of operating a communication system, in accordance with various embodiments of the present disclosure.

FIG. 9 is a flowchart of an example method 900 of operating a communication system, in accordance with various embodiments of the disclosure. Method 900 may be arranged in accordance with at least one embodiment described in the present disclosure. Method 900 may be performed, in some embodiments, by a device or system, such as system 100 of FIG. 1, system model 500 of FIG. 5, network 700 of FIG. 7, network 800 of FIG. 8, a system 1100 of FIG. 11, a system 2100 of FIG. 21, or another device or system. Although illustrated as discrete blocks, various blocks may be divided into additional blocks, combined into fewer blocks, or eliminated, depending on the desired implementation.

Method 900 may begin at block 902, wherein a cyclic prefix (CP) may be added to each block of a number of blocks of a first direct sequence spread spectrum (DSSS) signal to generate a first CP-DSSS signal, and method 900 may proceed to block 904. For example, a device (e.g., fUE 108 of femtocell 104 of FIG. 1) may add the CP to each block of the number of blocks of the first DSSS signal to generate the first CP-DSSS signal. More specifically, for example, a CP may be added to each block of the number of blocks via modulating a set of vectors (e.g., orthogonal vectors) that are cyclically shifted versions of a root sequence (e.g., a Zadoff-Chu root sequence).

At block 904, the first CP-DSSS signal may be transmitted to a base station, and method 900 may proceed to block 906. For example, the device (e.g., fUE 108 of FIG. 1) of a network (e.g., femtocell 104 of FIG. 1) may transmit the first CP-DSSS signal to a base station (e.g., FGW 106 of FIG. 1) of the network.

At block 906, the first CP-DSSS signal may be received at a receiver, and method 900 may proceed to block 908. More specifically, for example, the first CP-DSSS signal may be received at the base station (e.g., FGW 106 of FIG. 1) of the network.

At block 908, the CP from each block of the number of blocks of the first CP-DSSS signal may be removed to generate a received signal vector, and method 900 may proceed to block 910. For example, the receiver (e.g., FGW 106 of FIG. 1) may remove the CP from each block of the number of blocks of the first CP-DSSS signal to generate the received signal vector.

At block 910, the received signal vector may be dispread. For example, the receiver (e.g., FGW 106 of FIG. 1) may dispread the received signal vector via a Hermitian cyclically shifted versions of a root sequence (e.g., a Zadoff-Chu root sequence).

Modifications, additions, or omissions may be made to method 900 without departing from the scope of the present disclosure. For example, the operations of method 900 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment. For example, in various embodiments, method 900 may include one or more acts wherein signaling between devices of a femtocell (e.g., a FGW and at least some of a number of fUEs) are synchronized via downlink synchronization of a long-term evolution (LTE) network including the first network. As another example, in various embodiments, method 900 may include one or more acts wherein information is extracted from the dispread received signal vector via one of a number of detectors (e.g., a matched filer (MF) detector, a zero-forcing (ZF) detector, a minimum mean square (MMSE) detector, or a detector configured to extract log-likelihood ratio (LLR) values).

In another example, method 900 may include one or more acts including multi-user communication. More specifically, for example, method 900 may include one or more acts wherein downlink information including one or more CP-DSSS signals is transmitted from a FGW to multiple fUEs. In yet another example, method 900 may include one or more acts wherein uplink information including one or more CP-DSSS signals is transmitted from multiple fUEs to a FGW.

Various embodiments described below may relate to physical layer security of CP-DSSS signal. As will be appreciated, in orthogonal frequency division multiplexing (OFDM), each signal frame carries a number of data symbols that modulate a set of complex-valued sinusoidal signals/tones. Furthermore, by adding a CP to each signal frame, data carrying tones may correspond to an orthogonal basis set. Mathematically, a frame of a synthesized OFDM signal, excluding the CP, may be expressed as:

$$x = \sum_x s_k f_k; \tag{28}$$

wherein k covers a set of active subcarriers and $$f_k = \left[1 \ e^{\frac{j2\pi k}{N}} \ e^{\frac{j4\pi k}{N}} \ \cdots \ e^{\frac{j2\pi k(N-1)}{N}}\right]^T$$

is a column vector of length N, wherein superscript 'T' denotes transpose.

In OFDM, active tones are contiguous in k and, for example, a few subcarriers at two sides of a band may be suppressed to act as guard bands. Thus, the number of data symbols transmitted in each OFDM frame may be less than N. The summation in equation (28) is the Inverse Fast Fourier Transform (IFFT) operation in OFDM and N is the IFFT size.

A frame of a synthesized CP-DSSS signal, on the other hand, is generated as:

$$x = \sum_k s_k \eta_k; \tag{29}$$

wherein $\eta_k$ is a set of spreading gain vectors (i.e., of length N) that may be selected to be orthogonal to each other. Therefore, the set of spreading gain vectors may also be considered as a basis set that carry data symbols $s_k$. However, there is a fundamental difference between basis set $f_k$ of OFDM and basis set $\eta_k$ of CP-DSSS. While the OFDM basis set may be a set of narrowband signals, the CP-DSSS basis set may be selected to be broadband signals.

A set of $\eta_k$ for a CP-DSSS signal may be determined by selecting $\eta_0 = z_0$, wherein $z_0$ is a ZC sequence of length N (i.e., as defined above in equation (1)) and $z_1, z_2, \ldots, z_{N-1}$ may be circularly shifted versions of $z_0$ (i.e., as defined above in equation (2)).

The set of vectors $z_0, z_1, z_2, \ldots, z_{N-1}$ of ZC sequences may be orthogonal to each other (i.e., for all values of i and j in the range of 0 to N−1, as shown above in equation (10), and i≠j), wherein the superscript H in equation (10) above denotes Hermitian (i.e., conjugate transpose). This may satisfy the orthogonality requirement of the basis set $z_k$. Thus, $\eta_k = z_k$ is one option for forming a CP-DSSS waveform. This particular choice, as discussed more fully below, may allow for various security aspects of CP-DSSS. According to various embodiments, CP-DSSS signals may be constructed according to the following equation:

$$x = \sum_k s_k z_k. \tag{30}$$

Sequence $z_0$ may be normalized to the length of unity, and thus the orthogonality property of ZC sequences may follow equation (6) provided above.

Further, summation over k in equation (30) may cover a subset of indices {0, 1, . . . , N−1}. In other words, the number of symbols $s_k$ transmitted over each frame of a CP-DSSS waveform may be less than N. This may allow the symbol rate to be less than the transmission bandwidth, which may be typical of spread spectrum systems. In one control signaling example, only one or two bits may be transmitted over each CP-DSSS frame. According to various embodiments, N may be divisible by an integer L, and N/L symbols may be transmitted over each CP-DSSS frame. With symbols $$s_0, s_1, \cdots, s_{\frac{N}{L}-1},$$

the synthesized vector x of equation (30) may be expressed as:

$$x = ZEs; \tag{31}$$

wherein s is column vector of length N/L with elements of $$s_0, s_1, \cdots, s_{\frac{N}{L}-1},$$

E is an expander matrix that adds L−1 zeros after each element of s to make a column vector of length N, and Z is an N×N matrix with columns of $z_0, z_1, z_2, \ldots, z_{N-1}$.

After adding a CP to vector x and passing vector x through a channel with an impulse response h, a received signal, after removing the CP, may have the following form:

$$y = HZEs + v; \tag{32}$$

wherein v is the channel noise vector and H is a circulant matrix of size N×N whose first column is channel impulse response h appended with zeros to extend to the length N. To allow the formulation of equation (32), a length of h, denoted by $L_h$, may be less than or equal to a length of the CP.

Dispreading the received signal vector y may provide the following equation:

$$\tilde{y} = Z^H y = Z^H HZEs + \tilde{v}. \tag{33}$$

Matrices $Z^H$, H, and Z are circulant, circulant matrices are commutable in multiplication, $Z^H Z=I$, and based on equation (6) provided above, equation (33) may reduce to:

$$\tilde{y} = HEs + \tilde{v}. \tag{34}$$

Figure 10:
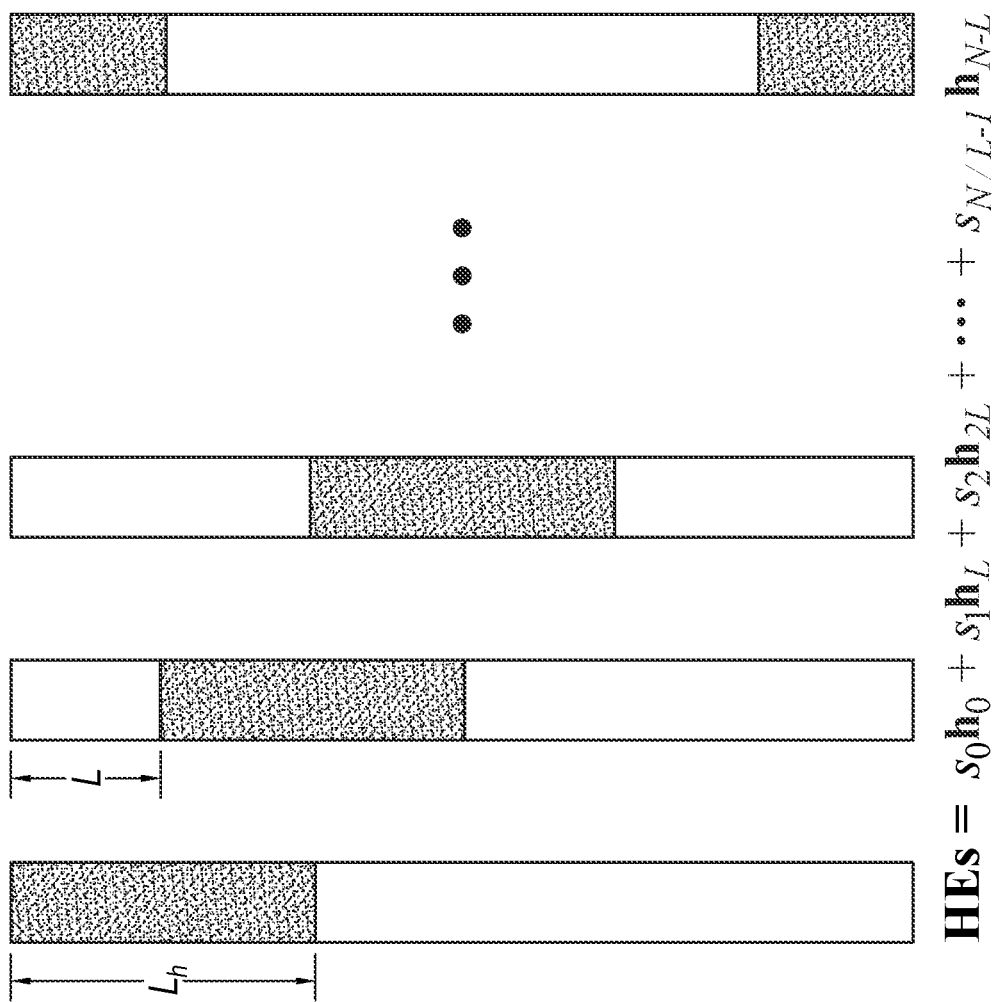
FIG. 10 depicts a number of columns of a matrix.

FIG. 10 depicts a number of columns of matrix HEs of equation (34), wherein inter-symbol symbol interference (ISI) may occur if $L_h > L$, and ISI may not occur when $L_h \leq L$. The vertical boxes in FIG. 10 represent columns of H, with shaded areas indicating non-zero terms.

Equation (34) may still be applicable in embodiments wherein a receiver includes multiple antennas, however, $\tilde{y}$, H, $\tilde{v}$ may be defined according to equation (24) above.

Various embodiments related to a matched filter (e.g., for uplink communication) will now be described. To determine an estimate of data symbols $$s_0, s_1, \cdots, s_{\frac{N}{L}-1}$$

from dispread signal vector $\tilde{y}$, vector $\tilde{y}$ may be multiplied by $E^H H^H$. For example, if N/L=3:

$$E^H H^H \tilde{y} = A \begin{bmatrix} s_0 \\ s_1 \\ s_2 \end{bmatrix} + E^H H^H \tilde{v}; \tag{35}$$

wherein $$A = E^H H^H HE = \begin{bmatrix} h_0^H h_0 & h_0^H h_L & h_0^H h_{2L} \\ h_L^H h_0 & h_0^H h_0 & h_0^H h_L \\ h_{2L}^H h_0 & h_0^H h_0 & h_0^H h_0 \end{bmatrix}. \tag{36}$$

As will be appreciated by a person having ordinary skill in the art, equation (35) may be generalized for an example wherein N/L is an arbitrary value.

As provided by equation (36), the diagonal elements of coefficient matrix A may indicate the received signal energy of each symbol that has been collected by the corresponding matched filter, and the off-diagonal elements are the ISI coefficients. These ISI coefficients may be all zero if $L \geq L_h$. When $L < L_h$, some of the ISI terms may be non-zero, but may vanish to zero as L increases or as the ISI terms are distanced from the diagonal of coefficient matrix A. When these off-diagonal elements are small, $$\frac{1}{h_0^H h_0} A \approx I$$

and thus $$\frac{1}{h_0^H h_0} E^H H^H \tilde{y}$$

may be an acceptable estimate of data vector s.

Following the above observation, the matched filter (e.g., in the uplink) may be expressed as:

$$\hat{s} = \frac{1}{h_0^H h_0} E^H H^H \tilde{y}; \tag{37}$$

wherein the hat sign over s (i.e., $\hat{s}$) indicates that equation (37) may provide an estimate of s.

In an example including multiple antennas at a device (e.g., a base station), equation (37) may be revised based on equation (24). As will be appreciated, the presence of multiple antennas at a device may lead to a greater processing gain, and more effective separation of signals from multiple users when transmitting simultaneously.

Various embodiments related to precoding (e.g., for downlink communication) will now be described. For transmission (e.g., downlink transmission), a precoded signal vector x may be generated and transmitted based on:

$$x = \frac{1}{\sqrt{h_0^H h_0}} H^H ZEs. \tag{38}$$

A scalar factor $$\frac{1}{\sqrt{h_0^H h_0}}$$

may be added such that the transmit power may be the same as a signal without precoding. The operation performed in equation (38) may circularly convolve the spread signal vector ZEs with the time reversed (and conjugated) version of the channel impulse response, and thus the operation performed via equation (38) may be referred to as "time-reversal precoding."

After the CP is added to vector x, the result may be transmitted through the channel. The received signal, after removing the CP, may be given by:

$$y = \frac{1}{\sqrt{h_0^H h_0}} H H^H ZEs + v; \tag{39}$$

wherein v is the channel noise.

At a receiver (e.g., of a UE), after applying dispreading, decimation, and adding a normalization factor $$\frac{1}{\sqrt{h_0^H h_0}},$$

the estimate of the symbol vector s may be provided by:

$$\hat{s} = \frac{1}{\sqrt{h_0^H h_0}} E^H H^H y. \tag{40}$$

In some examples, the precoding may rearrange the data symbols such that after passing through the channel, the channel may act as a matched filter and collect energy of each symbol at the respective receiver input. This may be considered some form of beamforming such that transmitted data vector s may be received by an intended device while maximizing the signal-to-noise ratio (SNR). Since the channel impulse response may vary with the position of the receiver, other devices may receive the data symbols with some degraded SNR, as will be discussed more fully below with regard to a secrecy feature of CP-DSSS.

In some examples, the scalar factor $$\frac{1}{\sqrt{h_0^H h_0}}$$

may not be available at a user equipment (UE) terminal. In these examples, the transmitted symbols may be binary or may belong to a QPSK constellation. In other examples, the scalar factor may be available to the UE or may be estimated.

When there are multiple antennas at a device (e.g., a base station), the precoded transmit signal at the mth antenna may be defined by:

$$x^{(m)} = \frac{1}{\sqrt{h_0^{(m)H} h_0^{(m)}}} H^{(m)H} ZEs. \quad (41)$$

Further, the received signal may be defined by:

$$y = \left( \sum_{m=1}^{M} \frac{1}{\sqrt{h_0^{(m)H} h_0^{(m)}}} H^{(m)} H^{(m)H} \right) ZEs + v. \quad (42)$$

In addition, equation (40) may be modified as:

$$\hat{s} = \frac{1}{\sum_{m=1}^{M} \sqrt{h_0^{(m)H} h_0^{(m)}}} E^H Z^H y. \quad (43)$$

Figure 11:
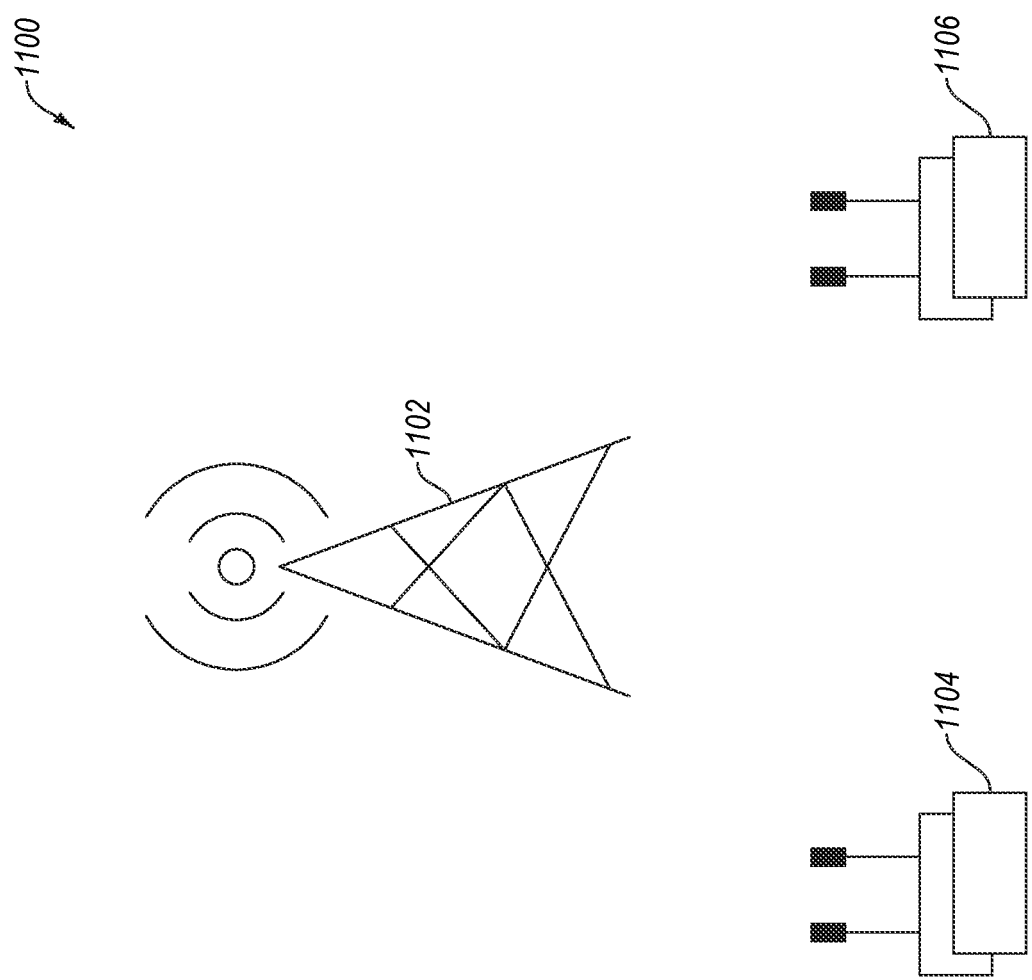
FIG. 11 depicts an example communication system, in accordance with various embodiments of the present disclosure.

FIG. 11 depicts a communication system 1100 including a number of devices, according to various embodiments of the disclosure. More specifically, communication system 1100 includes a base station 1102, user equipment (UE) 1104, and UE 1106. In some examples, as described more fully below, UE 1104 may be a legitimate UE, and UE 1106 may be a spoofing device (e.g., an intruder, a bad actor, an eavesdropper, etc.). Further, in some examples provided below, base station 1102 may be referred to as "Alice," UE 1104 may be referred to as "Bob," and UE 1106, which may be an eavesdropper, may be referred to as "Eve." Although FIG. 11 only depicts a single base station, a single legitimate UE, and a single spoofing UE, the disclosure is not so limited, and a communication system, according to various embodiments, may include any number of base stations and/or any numbers UEs (e.g., one or more legitimate UEs and/or one or more spoofing UEs).

Various embodiments related to authentication of a CP-DSSS signal will now be described. For a particular UE (e.g., UE 1104), it may be assumed that an initial authentication (e.g., using a single sign-on (SSO) method) has occurred and a base station (e.g., base station 1102) has obtained an initial estimate of the channel impulse response(s) between the UE (e.g., UE 1104) and antennas of the base station. As the UE communicates with the base station, on some specific resource slots, each UE (i.e., of a communication system) may transmit pilots to the base station for updating its channel estimate. Assuming that these pilots are transmitted within an interval that is smaller than the coherent time of the channel response, a new estimate of the channel impulse response may be about the same as a previous estimate. Any significant difference between these two estimates may indicate a spoofing scenario, and thus a base station (e.g., base station 1102 of FIG. 11) may perform a precautionary action. In one example, a new channel estimate (i.e., of a newly received signal), quantified by vector $h_{new}$, may be compared to a previously estimated channel impulse response (i.e., of a previously received signal), quantified by vector $h_{old}$, according to the following equation:

$$\gamma = \frac{|h_{old} - h_{new}|}{|h_{old}|}; \quad (44)$$

wherein |x| indicates a length of a vector x. If γ is less than some threshold (e.g., 0.15, 0.1, 0.05, or another value), it may be determined (e.g., via the base station) that the pilot symbol is coming from a legitimate UE (e.g., UE 1104). Otherwise, it may be determined (e.g., via the base station) that spoofing is occurring (i.e., the pilot symbol is being transmitted or was transmitted by a spoofing device (e.g., UE 1106)). Other measures may also be used to identify a spoofing event and/or device.

In some examples, an intruder (e.g., UE 1106) may choose not to send any pilots, but send some information to camouflage the base station. In this example, assuming that the channel between the intruder and antennas of the base station is different from that of legitimate UEs, the pattern of the received signal after passing through the matched filter at the base station may be significantly different from a pattern of a signal from a legitimate UE. Such deviation may be used to identify the presence of a spoofing device.

Various methods may be used to identify the presence of an intruder. For example, a matched filter signal level may be measured (e.g., at a communication device, such as a base station), quantified by a parameter a (e.g., its rms value), and if a large percent of the signal samples at the points where large amplitude signals are expected drop below a specified threshold (e.g., K×a for a preselected value of K), it may be determined (e.g., via a base station) that spoofing may be occurring.

Figure 12A:
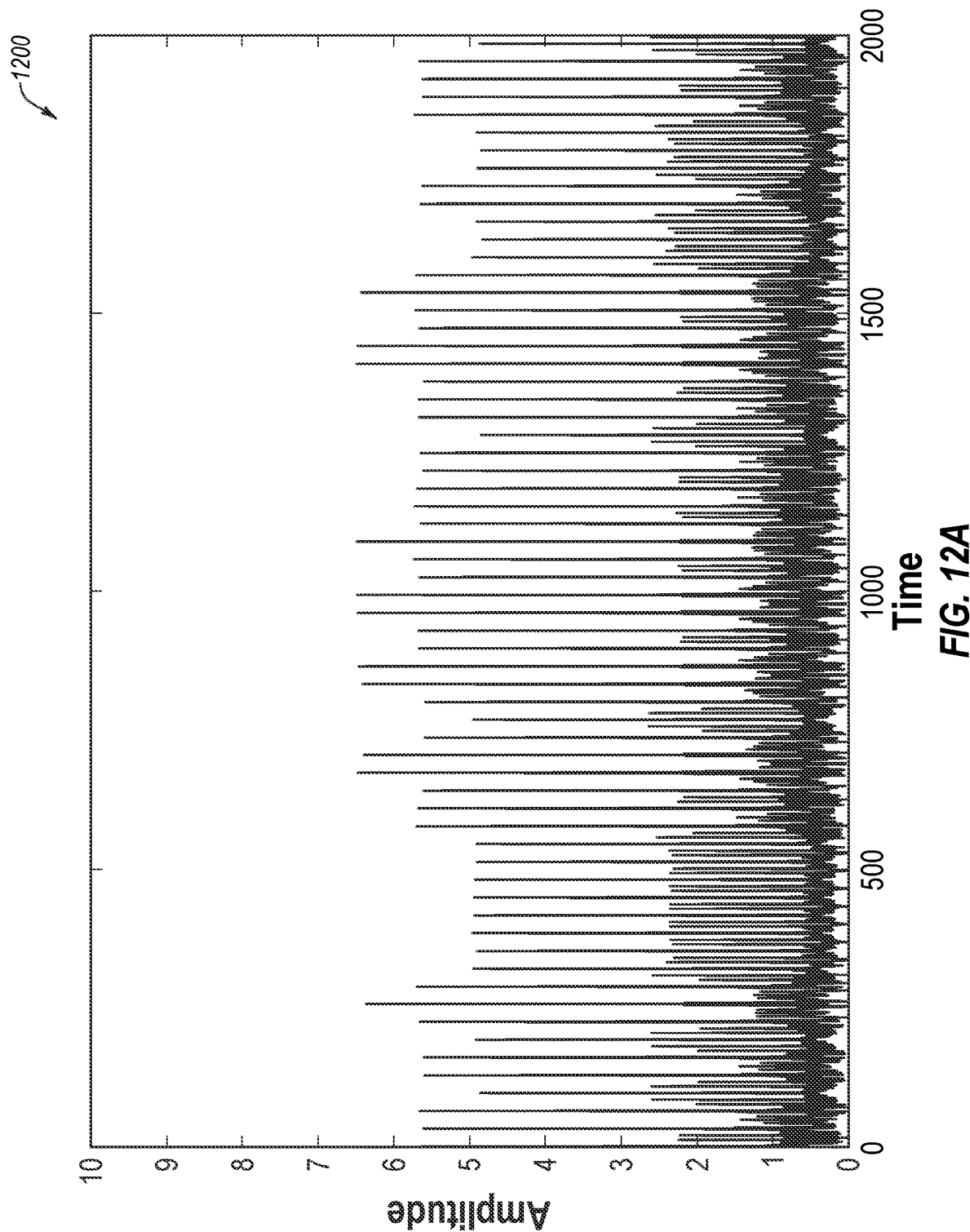
FIG. 12A is a plot depicting a magnitude of a sample transmitted signal by a legitimate device and received at a base station after passing through a matched filter, according to various embodiments of the disclosure.
Figure 12B:
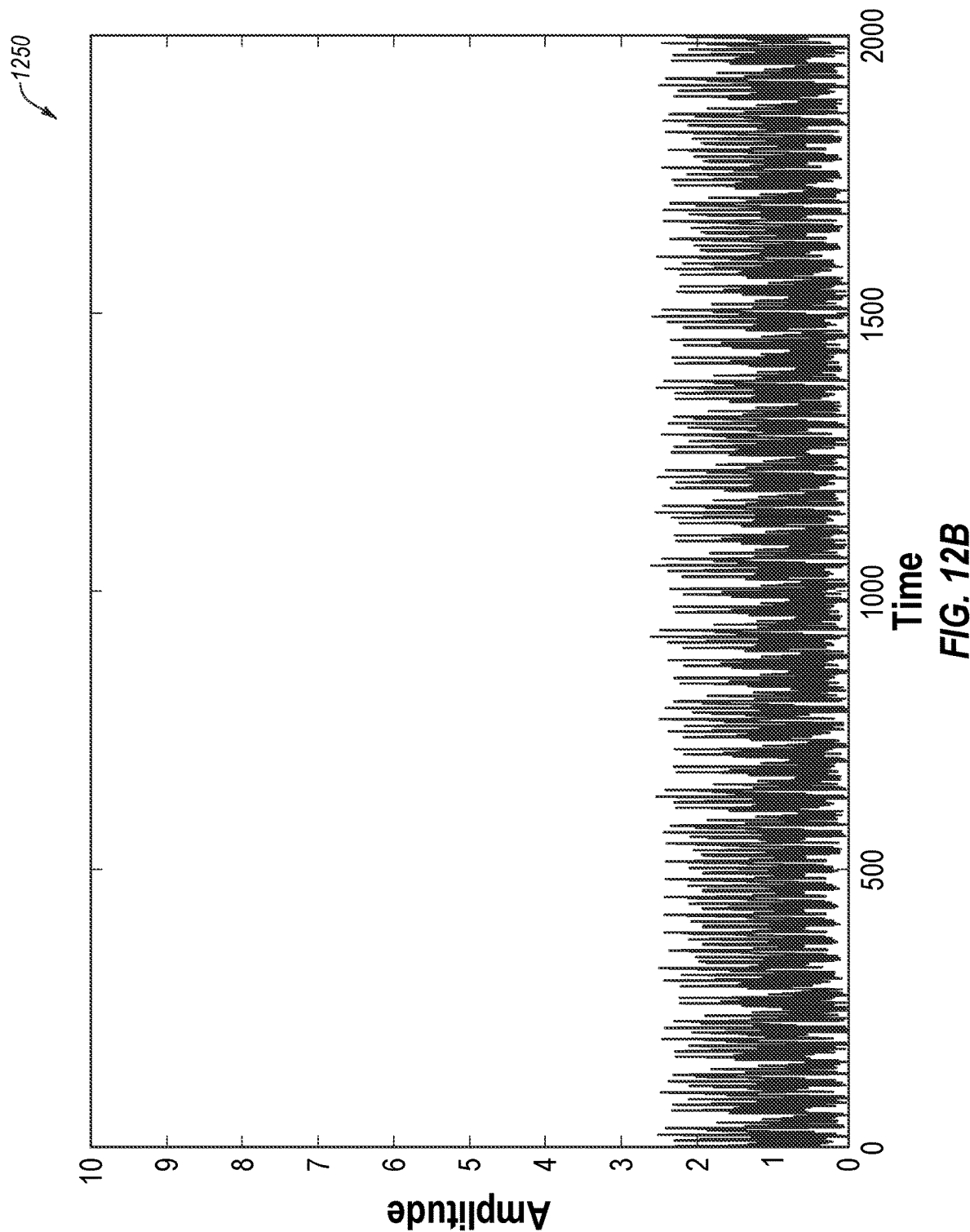
FIG. 12B is a plot depicting a magnitude of a sample transmitted signal by a spoofing device and received at a base station after passing through a matched filter, according to various embodiments of the disclosure.

FIG. 12A is a plot 1200 depicting a magnitude of a sample transmitted by a legitimate UE and received at a base station after passing through a matched filter. FIG. 12B is a plot 1250 depicting a magnitude of a sample transmitted by a spoofing device and received at a base station after passing through a matched filter. According to some embodiments, regular high level sample values at regular spacing of L samples (e.g., as depicted in FIG. 12A) may indicate a legitimate UE, otherwise, if regular high level sample values at regular spacing of L samples are absent (e.g., as depicted in FIG. 12B), the received signal may have been transmitted from a spoofing device. In the examples shown in FIGS. 12A and 12B, parameter L was set equal to 32.

As will be appreciated, authentication may be extended to examples including multiple antennas. Further, equation (44) may be extended to multiple channels, and the similarity of the estimated channels over time may be evaluated. Moreover, for evaluating the signal property/pattern of a received signal, a signal may be evaluated after combining signals from a number of antennas.

Various embodiments related to adding artificial noise to a CP-DSSS signal and a CP-DSSS signal including artificial noise will now be described. As described above, a precoding method may condition signal vector x such that after passing through a channel, received signal samples, after dispreading, may be enhanced at time indices that correspond to transmitted symbols (e.g., at the index positions 0, L, 2L, . . . ). This may be applicable to examples wherein a device (e.g., a base station) has a single antenna or multiple antennas. Thus, in CP-DSSS, precoding may include a physical layer security technique.

One method of measuring physical layer security of a link is to assure that a legitimate party (e.g., UE 1104 of FIG. 11) receives the transmitted message with a sufficient SNR that allows for successful decoding. On the other hand, an eavesdropper (e.g., UE 1106 of FIG. 11) may receive the message with a much reduced SNR that warrants its decoding significantly less likely.

The time-reversal precoding method discussed above may shape transmit signal vector x such that after passing through a channel of an intended user, a received signal, after dispreading and extracting the relevant samples at spacing L, provides good estimates of the transmitted information symbols. In other words, time-reversal spreads signal samples at a transmitter, and a channel dispreads the signal samples at a receiver input at some pre-specified positions in time. For an eavesdropper with a channel that is different from that of the legitimate UE/receiver, the performed dispreading by the channel may be ineffective, and the received signal may have a much lower SNR.

To ensure there is enough noise such that a signal received by an eavesdropper (e.g., UE 1106 of FIG. 11) drops to a sufficiently low SNR level (i.e., such that the available capacity remains below the transmission rate), some artificial noise may be added at a transmitter (e.g., of base station 1102 or UE 1104 of FIG. 11). In some embodiments, an amount of artificial noise added to a CP-DSSS signal may be within a range or intelligently designed to keep the SNR at a legitimate UE at a sufficient level to warrant successful detection of the transmitted information.

According to some embodiments, artificial noise may be added to a CP-DSSS signal via adding a vector of noise (e.g., samples of white noise) to vector x before transmission. The dispreading effect performed by the channel may improve SNR at a legitimate UE (e.g., UE 1104), and thus correct decoding of the transmitted information at the legitimate UE may be possible. However, at an input of an eavesdropper (e.g., UE 1106), SNR may remain low, and thus, decoding of the transmitted information may not be possible. There may be instances where a channel of an eavesdropper may be similar to that of a legitimate UE, and thus the SNR at the eavesdropper may not drop to a sufficiently low level to secure the transmitted information.

As described above, time-reversal precoding may introduce some inter-symbol interference (ISI) that may be considered as extra channel noise. According to various embodiments, signal processing may be used to (i) avoid ISI through use of a precoder; and (ii) artificial noise, to be added at a transmitter, may be designed such that the artificial noise remains orthogonal to data symbols recovered at a legitimate UE.

To avoid ISI, the time-reversal precoder matrix $H^H$ in equation (38) may be replaced by a precoder matrix G. Accordingly, the precoded signal vector x may be expressed as:

$$x = GZEs. \quad (45)$$

Similar to H (and $H^H$), precoder matrix G may be selected to be circulant. The first column of precoder matrix G is denoted by $g_0$. To ensure that precoder matrix G does not affect the transmit power, $g_0$ may be normalized to the length of unity (i.e., $g_0^H g_0 = 1$).

As vector x passes through a channel and the CP is removed from a received signal, and dispreading, normalizing, and decimating applied to the result, the symbol vector s free of ISI may be obtained. Mathematically, this may be expressed as:

$$s = \frac{1}{\zeta} E^H Z^H H x = \frac{1}{\zeta} E^H Z^H H G Z E s; \quad (46)$$

wherein $1/\zeta$ is a normalization constant whose value, is determined below.

For equation (46) to remain true, precoder matrix G may be selected such that:

$$E^H Z^H H G Z E = \zeta I. \quad (47)$$

Matrices $Z^H$, H, G, and Z are circulant, and thus are commutable, and $Z^H Z = I$, and equation (47) may be simplified as:

$$E^H H G E = \zeta I. \quad (48)$$

Further, $H_0 = E^H H$, wherein $H_0$ is the L fold decimated version of H across its rows. That is, $H_0$ is an $$\frac{N}{L} \times N$$

matrix obtained by maintaining rows 0, L, 2L, . . . of H. The matrix GE, on the other hand, may be determined via precoder matrix G by a L fold decimation across the columns of matrix G. Equating the first columns of the left and right-hand sides of equation (43) provides:

$$H_0 g_0 = \begin{bmatrix} \zeta \\ 0 \\ \vdots \\ 0 \end{bmatrix}. \quad (49)$$

Since $g_0$ is unknown, $\zeta$ is also unknown. Equation (49) may be rearranged as:

$$H_0 g_0' = \begin{bmatrix} 1 \\ 0 \\ \vdots \\ 0 \end{bmatrix}; \quad (50)$$

wherein $$g_0' = \frac{1}{\zeta} g_0.$$

Since $g_0'$ has a length of N, but there are only N/L equations in equation (50), equation (50) is an underdetermined equation with infinite solutions. Accordingly, the regularized solution of equation (51) may be used.

$$g_0' = R_0^{-1} p; \quad (51)$$

wherein $R_0 = H_0^H H_0 + \delta_0 I$, $$p = H_0^H \begin{bmatrix} 1 \\ 0 \\ \vdots \\ 0 \end{bmatrix},$$

and $\delta_0$ is a small positive constant that is added to make $R_0$ invertible.

Once $g_0'$ is obtained, $g_0'$ may be normalized to obtain $$g_0 = \frac{1}{\sqrt{g_0'^H g_0'}} g_0'.$$

It is noted that it is also implied that $$\zeta = \frac{1}{\sqrt{g_0'^H g_0'}}.$$

Moreover, the normalized vector $g_0$ may be used to construct precoder matrix G.

To generate an artificial noise that remains orthogonal to the data symbols $$s_0, s_1, \ldots, s_{\frac{N}{L}-1},$$

within each CP-DSSS signal frame, it is noted that these symbols are transmitted at symbol indices 0, L, 2L, . . . . Precoder matrix G may be selected such that at the receiver after dispreading and decimation, the data symbols, $$s_0, s_1, \ldots, s_{\frac{N}{L}-1}$$

may be recovered free of ISI. The artificial noise samples may be obtained by modulating a set of random signal samples that, as the random signal samples go through the channel and processing steps at the receiver, the random signal samples may be nulled out at the legitimate UE at the time indices 0, L, 2L, . . . .

With a noise vector n of length N, an artificial noise vector $x_n$ may be defined as:

$$x_n = Zn. \quad (52)$$

Artificial noise vector $x_n$ may be added to information vector x before transmission. Further, for $x_n$ to not affect the extracted data symbols, equation (53) may be true.

$$E^H Z^H H x_n = E^H Z^H H Z n = 0. \quad (53)$$

According to equation (53), certain constraints may be applied to noise vector n. Further, since Z and H are circulant matrices, $Z^H H Z = Z^H Z H = H$, and $E^H H = H_0$, equation (53) may be simplified as:

$$H_0 n = 0; \quad (54)$$

wherein n is of size N×1 and $H_0$ is of size $$\frac{N}{L} \times N.$$

Noise vector n includes N elements that may be correlated according to $$\frac{N}{L}$$

linear equations defined by equation (54). Different approaches may be taken to assure the identity of equation (54) when n is non-zero. For example, according to some embodiments, equation (54) may be multiplied by $H_0^H$, providing:

$$A_0 n = 0; \quad (55)$$

wherein $A_0 = H_0^H H_0$ is an N×N matrix.

Since $H_0$ has a rank of N/L, $A_0$ also is of rank N/L. This implies that $A_0$ has N–N/L zero eigenvalues. All the eigenvectors that are associated with these zero eigenvalues are non-zero vectors that satisfy equation (54). Calling these eigenvectors $$q_0, q_1, \ldots, q_{N-\frac{N}{L}-1},$$

any construction of n based on a linear combination of these eigenvectors may also satisfy equation (54). Accordingly, the following construction may be used:

$$n = n_0 q_0 + n_1 q_1 + \ldots + n_{N-\frac{N}{L}-1} q_{N-\frac{N}{L}-1}; \quad (56)$$

wherein $n_0$ through $$n_{N-\frac{N}{L}-1}$$

are a set of random numbers that may vary among different CP-DSSS frames to improve the secrecy of the enciphered messages.

Conventional blind detectors that may be employed by an eavesdropper to identify the underlying channel between the transmitted information and the received signal at the eavesdropper input may operate based on the correlation properties of the transmitted and/or the received signal. Accordingly, the transmitted information may be made invisible to eavesdropper, if the added artificial noise is selected such that the transmit signal may be made close to a white process (e.g., the elements of the transmit signal vector are (nearly) uncorrelated).

To synthesize a transmit signal that satisfies the above requirement, with the added artificial noise, we note that the transmit signal has the form of:

$$x_{tx} = GZEs + n; \quad (57)$$

wherein the artificial noise vector n is constructed according to equation (56). The correlation among the elements of $x_{tx}$ may be measured via the covariance matrix:

$$C = E[x_{tx} x_{tx}^H]; \quad (58)$$

wherein H denotes conjugate transpose or Hermitian. Artificial noise vector n may be selected such that matrix C is approximately equal to KI, where K is some constant and I is the identity matrix. This may equivalently be written in terms of the spectrum of $x_{tx}$, defined by the vector $\phi$ having elements that are the expected value of the magnitude square of the elements of the DFT of $x_{tx}$. When the elements of $x_{tx}$ are uncorrelated, $\phi$ is a vector with equal elements.

To evaluate the expected value of the magnitude square of the elements of the DFT of $x_{tx}$, $x_{tx}$ may be expanded as:

$$x_{tx} = s_0 g'_0 + s_1 g'_L + \ldots + s_{\frac{N}{L}-1} g'_{N-L} + n_0 q_0 + n_1 q_1 + \ldots + n_{N-\frac{N}{L}-1} q_{N-\frac{N}{L}-1}; \quad (59)$$

wherein $g_k'$ is the kth column of GZ, and the coefficients $$s_0, s_1, \ldots, s_{\frac{N}{L}-1} \text{ and } n_0, n_1, \ldots, n_{N-\frac{N}{L}-1}$$

are a set of independent/uncorrelated random variables.

Using equation (59), and denoting DFT of a vector v by $v_f$, $$E[|x_{f,tx}|^2] = \sigma_s^2 |g'_{f,0}|^2 + \sigma_s^2 |g'_{f,L}|^2 + \ldots + \quad (60)$$
$$\sigma_s^2 |g'_{f,N-L}|^2 + \sigma_0^2 |q_{f,0}|^2 + \sigma_1^2 |q_{f,1}|^2 + \ldots + \sigma_{N-\frac{N}{L}-1}^2 |q_{f,N-\frac{N}{L}-1}|^2;$$

wherein it may be assumed that the variances of the data symbols are all the same and equal to $\sigma_s^2$, and $\sigma_0^2$ through $$\sigma_{N-\frac{N}{L}-1}^2$$

indicate the variances of $n_0$ through $$n_{N-\frac{N}{L}-1}.$$

As discussed below, these variances may be taken as a set of parameters that are selected for flattening the spectrum of $x_{tx}$.

Further, recalling that $g_L$ through $g_{N-L}$ may be obtained via circular shifts of $g_0$, $|g_{f,0}'|^2 = |g_{f,L}'|^2 = \ldots = |g_{f,N-L}'|^2$, equation (59)

$$E[|x_{f,tx}|^2] = \sigma_s^2 \frac{N}{L} |g'_{f,0}|^2 + \sigma_0^2 |q_{f,0}|^2 + \sigma_1^2 |q_{f,1}|^2 +$$

may simplify to:

$$\ldots + \sigma_{N-\frac{N}{L}-1}^2 |q_{f,N-\frac{N}{L}-1}|^2. \quad (61)$$

In equation (61), all the terms with the exception of the variance terms $\sigma_0^2$ through $$\sigma_{N-\frac{N}{L}-1}^2$$

may be known. To synthesize a transmit signal vector with a close to white spectrum the variance terms $\sigma_0^2$ through $$\sigma_{N-\frac{N}{L}-1}^2$$

may be selected such that the elements of $E[|x_{f,tx}|^2]$ may be as close as possible to one another.

It is noted that various approaches may be taken for optimizing variance terms $\sigma_0^2$ through $$\sigma_{N-\frac{N}{L}-1}^2.$$

In one example, $E[|x_{f,tx}|^2]$ may be equal to a vector d that has the following form $d = d_0 1$, wherein $d_0$ is some constant and 1 is a vector of length N with elements of ones. Accordingly, an optimization problem (i.e., to minimize $$\left\| Q\theta + \sigma_s^2 \frac{N}{L} |g'_{f,0}|^2 - d \right\|^2,$$

subject to the constraint of keeping all the elements of $\theta$ positive) may be formulated as a least squares optimization on the range of the parameters $\sigma_0^2$ through $$\sigma_{N-\frac{N}{L}-1}^2.$$

The parameter vector, of size $$\left(N - \frac{N}{L} - 1\right) \times 1,$$

may be defined as:

$$\theta = \begin{bmatrix} \sigma_0^2 \\ \vdots \\ \sigma_{N-\frac{N}{L}-1}^2 \end{bmatrix}. \quad (62)$$

Further, the coefficient matrix, of size:

$$N \times \left(N - \frac{N}{L} - 1\right),$$

may be defined as:

$$Q = \left[ |q_{f,0}|^2 \quad \ldots \quad |q_{f,N-\frac{N}{L}-1}|^2 \right]. \quad (63)$$

Here, $\|\cdot\|^2$ refers to the norm square of a vector. Further, the above definitions of C and $\theta$ may imply that:

$$Q\theta = \sigma_0^2|q_{f,0}|^2 + \sigma_1^2|q_{f,1}|^2 + \ldots + \sigma_{N-\frac{N}{L}-1}^2 \left|q_{f,N-\frac{N}{L}-1}\right|^2; \quad (64)$$

and, thus, the above minimization attempts to flatten the spectrum of $x_{tx}$. It may be further noted that imposing the positive constraint to the elements of θ may be needed since the variance terms $\sigma_0^2$ through $$\sigma_{N-\frac{N}{L}-1}^2$$

may not be negative.

The choice of constant $d_0$ in the definition $d=d_0 1$ may be considered. A large value of $d_0$ may lead to a significant increase in the transmit power. On the other hand, a small value of $d_0$ may lead to a small level of artificial noise, hence, may still keep the spectral content of the transmitted message observable. According to some embodiments, $d_0$ may be set equal to the maximum element of the vector $$\sigma_s^2 \frac{N}{L} |g'_{f,0}|^2.$$

Figure 13:
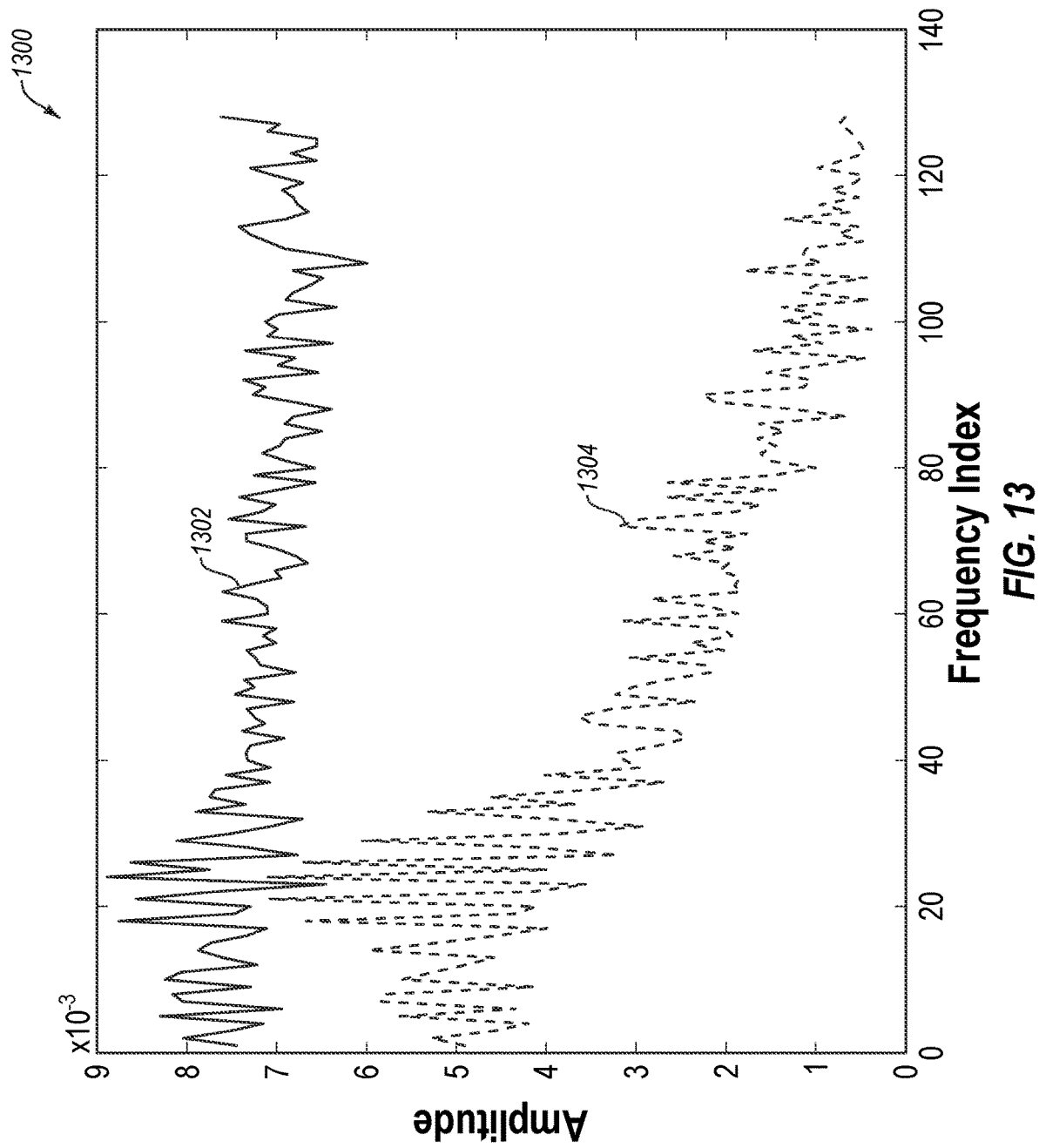
FIG. 13 is a plot depicting an example of spectral content of a transmit signal with and without artificial noise, according to various embodiments of the present disclosure.

FIG. 13 is a plot 1300 depicting an example of spectral content of the transmit signal $x_{tx}$, with artificial noise (i.e., signal 1302) and without artificial noise (i.e., signal 1304), with $d_0$ set equal to the maximum element of the vector $$\sigma_s^2 \frac{N}{L} |g'_{f,0}|^2.$$

As will be appreciated, the addition of the artificial noise may hide the spectral content of the information signal beneath a relatively flat spectrum, making it nearly impossible for an intruder to extract the transmitted information from the received signal.

The flatness of the spectrum of $x_{tx}$ may be further improved (thus, improving the secrecy of the transmitted messages) by modifying the construction of equation (57) as:

$$x_{tx} = GZEs + n + n'; \quad (65)$$

wherein n' is an additional artificial noise vector of length N with elements that are a set of independent random variables with variances that are set to compensate for the variation of the spectral elements of $x_{tx}$.

It should be noted that unlike n which, by design, may not have an impact on the recovered data symbols at the legitimate receiver, part of n' may leak to the recovered data symbols, and thus may have some negative impact on receiver performance of a legitimate UE.

Following the precoder and the artificial noise design disclosed above, a channel model between a first party ("Alice") (e.g., base station 1102 of FIG. 11) and a second party ("Bob") (e.g., UE 1104 of FIG. 11) has the form:

$$y_B = s + v_{B,o}; \quad (66)$$

wherein $v_{B,o}$ is the channel noise (and some leakage from n', if included in the construction of $x_{tx}$) after dispreading and decimation (e.g., at a detector output).

The artificial noise vector n may be removed by the channel effect and the transmitted symbols (the elements of s) may be separated.

The received signal at a receiver input of a third party (i.e., an eavesdropper "Eve") (e.g., UE 1106 of FIG. 11), on the other hand, may be expressed as:

$$y_E = H_{AE}(GZEs + n) + v_{E,i}; \quad (67)$$

wherein $H_{AE}$ is the circulant channel gain matrix between Alice and Eve, and $v_{E,i}$ is the channel noise at the receiver input of Eve. The artificial noise vector n, as noted above, is generated as:

$$n = Q\Sigma n_0; \quad (68)$$

wherein the matrix Q is of size $$N \times \left(N - \frac{N}{L}\right)$$

and has $$q_0, q_1, \ldots, q_{N-\frac{N}{L}-1}$$

as its columns, Σ is a diagonal matrix with the optimized diagonal elements of $$\sigma_0, \sigma_1, \ldots, \sigma_{N-\frac{N}{L}-1}$$

(optimized as described above), and $n_0$ is a vector of length $$N - \frac{N}{L}$$

with Gaussian, independent, complex-valued, and unit variance elements.

Since, in general, $H_{AE} \neq H_{AB}$, the signal received at Eve, (i.e., $y_E$) in addition to channel noise $v_E$, may suffer from inter-symbol interference as well as some residual part of the transmitted artificial noise. Thus, expectedly, the quality of the received signal at Eve is worse than its counterpart at Bob. On the other hand, the security of the transmitted information against the eavesdropper, Eve, may be measured by the secrecy capacity that is defined as:

$$C_s = C_B - C_E; \quad (69)$$

wherein $$C_B = \frac{1}{2}\log\left(1 + \frac{\sigma_s^2}{\sigma_{v_{B,o}}^2}\right); \quad (70)$$

and $$C_E = \frac{1}{2}\log\left(1 + \frac{\sigma_s^2}{\sigma_{v_{E,o}}^2}\right). \quad (71)$$

Here, $\sigma_s^2$ is variance of the data symbols (i.e., variance of the elements of s), $\sigma_{v_{B,o}}^2$ is the variance of the elements of the noise vector $v_{B,o}$, and $\sigma_{v_{E,o}}^2$ is the variance of the elements of the noise vector at the detector output of Eve.

For Eve to implement an optimum detector, Eve may have access to all the involved parameters in equations (67) and (68) (i.e., $H_{AE}$, G, Z, E, Q, and $\Sigma$). Accordingly, since G, Q and $\Sigma$ depend on the channel between Alice and Bob, G, Q, and $\Sigma$ are unknown to Eve. Thus, implementation of any detector by Eve may involve a blind detector for estimation of these unknown parameters. However, the addition of artificial noise, which may whiten the transmitted signal, may make estimation of these unknown parameters very hard, if not impossible.

According to some embodiments, the channel quality of the eavesdropper is a function of the channel impulse response of Alice-Eve and its possible similarity with the channel impulse response of Alice-Bob. Since these responses are random, the eavesdropper channel quality is also random and may vary from time-to-time or from case-to-case.

According to some embodiments, a statistical method may be performed wherein a large number of Alice-Bob and Alice-Eve channels may be simulated, and for each case, the SINR of Alice-Eve channel may be measured and compared against that of the Alice-Bob channel to generate statistical data. The statistical data may be used to quantify the eavesdropper channel quality and, accordingly, the secrecy capacity.

Figure 14:
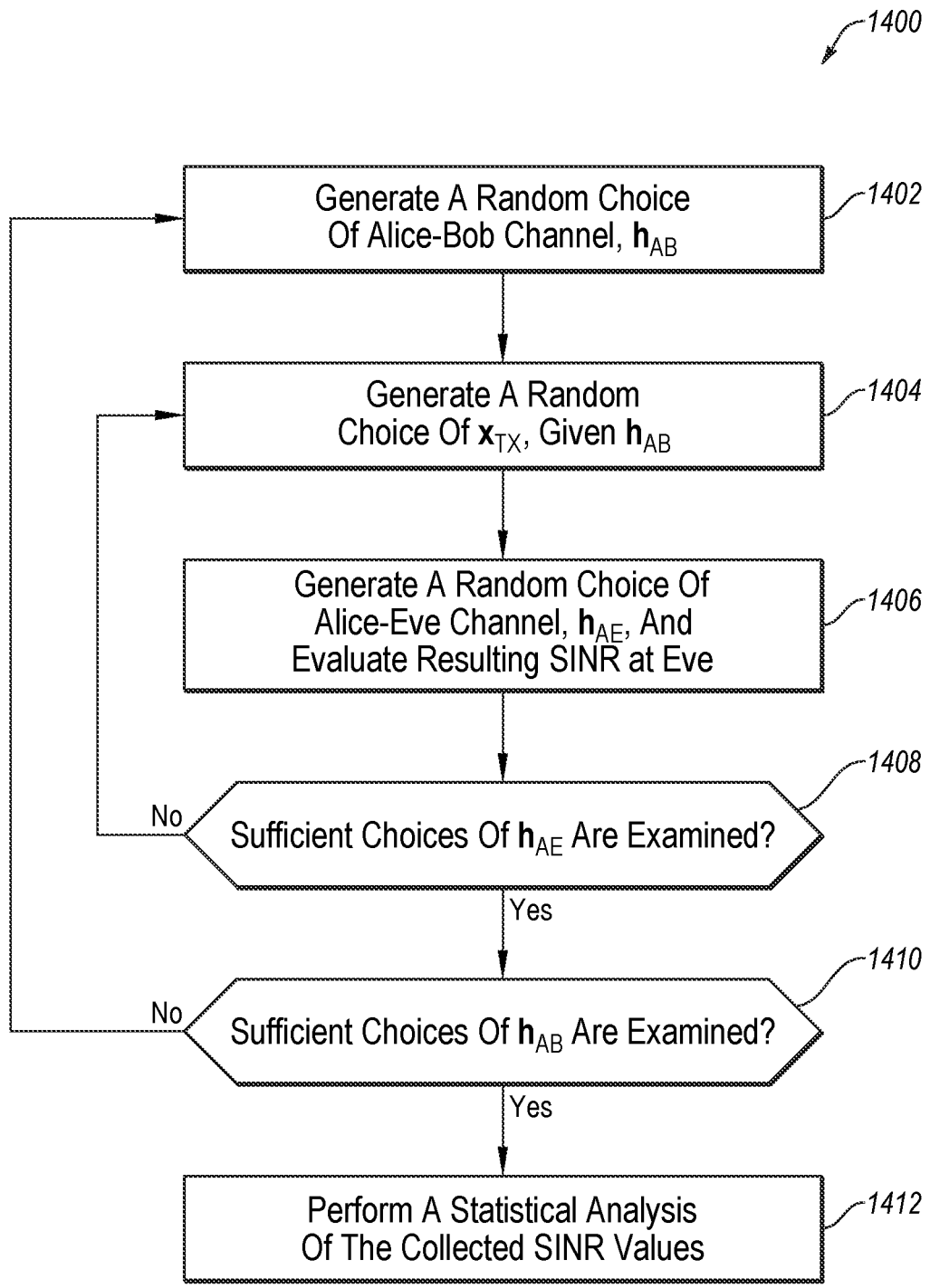
FIG. 14 is a flowchart of an example method of generating experimental results, in accordance with various embodiments of the disclosure.

FIG. 14 is a flowchart of an example method 1400 of generating experimental results, in accordance with various embodiments of the disclosure. Method 1400 may begin at block 1402, wherein a random choice of an Alice-Bob channel, denoted by $h_{AB}$, may be generated. At block 1404, using $h_{AB}$, a set of random transmit signals $x_{tx}$ may be generated (e.g., based on equation (57)). At block 1406, for each choice of $x_{tx}$, a random channel $h_{AE}$, connecting Alice and Eve, may be generated and the recovered data symbols at Eve may be calculated, and accordingly the eavesdropper channel quality may be evaluated by measuring the relevant SINR. The calculations performed at block 1406 may use the following equations:

$$\text{Recovered symbol vector at Eve: } \hat{s}_E = E^H(H_{AE}x_{tx} + v_{E,i}). \quad (72)$$

$$\text{Error vector: } e = s - \hat{s}_E. \quad (73)$$

$$\text{Signal-to-interference-plus-noise ratio: } SINR = \frac{s^H s}{e^H e}. \quad (74)$$

It is noted that $\hat{s}_E$ may include some noise that may at least partially originate from the artificial noise (e.g., introduced in generating $x_{tx}$) and at least partially due to the channel noise $v_{E,i}$, as well as some inter-symbol interference among the elements of s.

At block 1408, it may be determined as to whether sufficient choices of channel $h_{AE}$ are examined, and at block 1410, it may be determined as to whether sufficient choices of channel $h_{AB}$ are examined. At block 1412, a statistical analysis of collected SINR values may be performed.

Figure 15A:
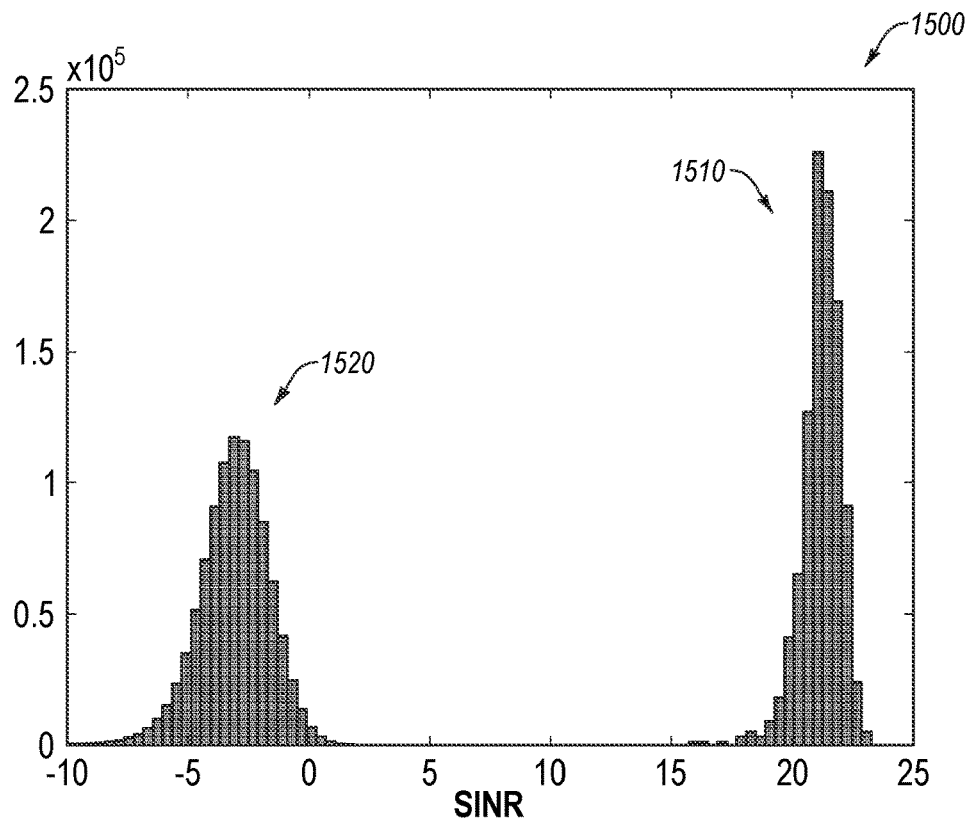
FIG. 15A is a plot depicting results of an example experiment.

FIG. 15A is a plot 1500 depicting results of an example experiment, wherein 1000 choices of $h_{AB}$, and, for each $h_{AB}$, 1000 choices of $h_{AE}$, were examined. These correspond to a total 1,000,000 examined values of SINR. For this experiment, the parameters N=128 and L=2 were used, and the statistical channels for both Alice-Bob and Alice-Eve are the same and are based on an exponentially decaying power-delay profile with time constant of 20 samples. The channel noise was selected such that the SNR at both Bob's and Eve's input was equal to 20 dB. It is noted that the results presented in FIG. 15A involve a case wherein $x_{tx}$ was generated according to equation (57) (i.e., the case where the spectrum of $x_{tx}$ is approximately white). FIG. 15A shows that the quality of Bob's channel (depicted by reference numeral 1510) is significantly better than that of Eve's channel (depicted by reference numeral 1520). Also, following the definition of the secrecy capacity, according to equation (69), here, $C_s \geq 15$ dB.

Figure 15B:
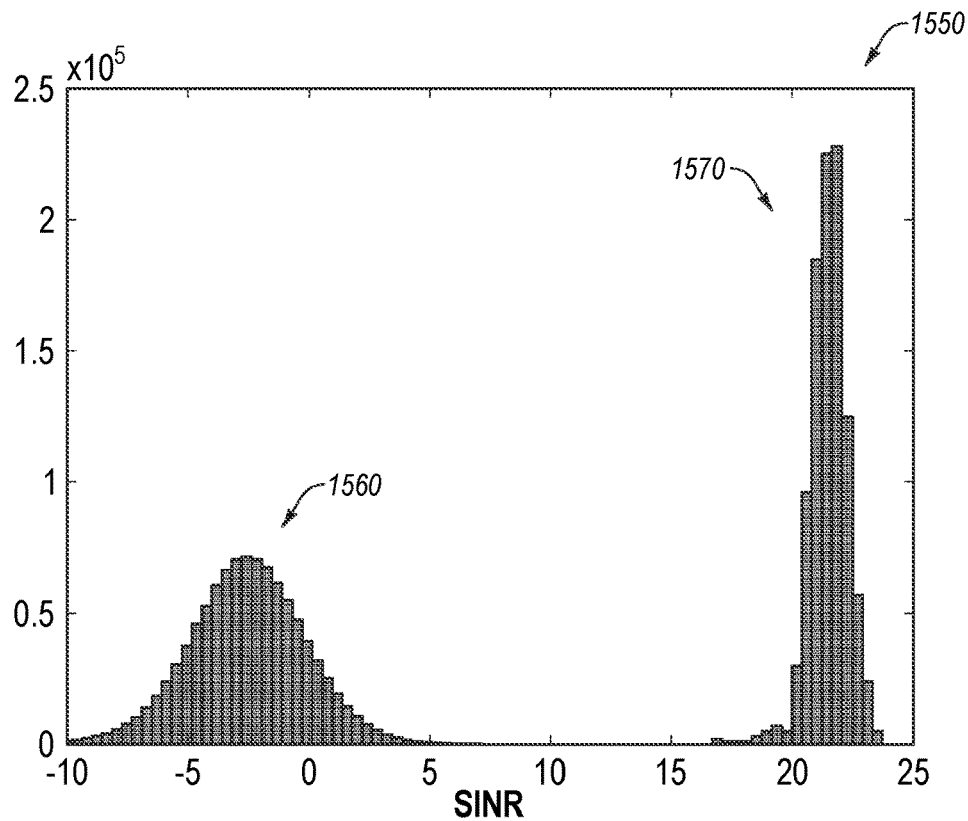
FIG. 15B is a plot depicting results of another example experiment.

FIG. 15B is a plot 1550 depicting results wherein the channel model time-constant was reduced from 20 to 5 samples. Here, Eve's SINR results (depicted by reference numeral 1560) have improved about 3 dB, while that of Bob's (depicted by reference numeral 1570) remained unchanged. Further, a wider variation of the eavesdropper channel quality exists. In particular, a larger percentage of cases with SINR of above 0 dB were observed. Accordingly, in this example, the secrecy capacity has reduced by about 3 dB.

One important difference between the experiments that led to the results is FIGS. 15A and 15B is channel durations. In FIG. 15A, the channel length is four times longer than the channel length in FIG. 15B. A longer length in channel duration may be equivalent to more randomness in the channel, hence, less similarity between the channels of Alice-Bob and Alice-Eve which then relate to more secrecy of the pre-coded information.

According to various embodiments, multiple antennas at the transmitter and/or receiver may be used (e.g., to possibly increase the secrecy capacity of the transmitted information). Multiple antennas may make use of the channels between multiple pairs of antennas in constructing an effective channel with a long duration, arising from concatenation of the various channel impulse responses between different pairs of transmit and receive antennas.

Figure 16:
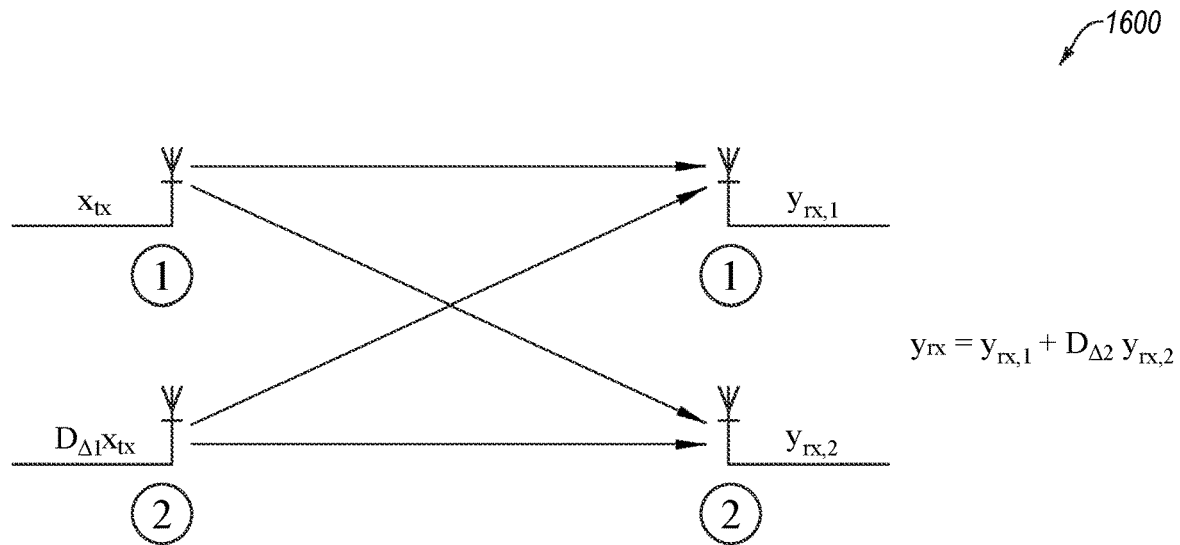
FIG. 16 depicts an example system including two pairs of antennas, according to various embodiments of the disclosure.

FIG. 16 depicts a 2×2 MIMO system 1600 including two pairs of antennas, according to various embodiments of the disclosure. In this example, $D_\Delta$ is a circulant matrix that is selected such that when pre-multiplies a vector, it circularly shifts downward the elements of this vector by $\Delta_1$ elements.

Defining $H_{ab}$ as the circulant channel matrix between a transmit antenna "a" and a receive antenna "b," may provide:

$$y_{rx} = H_{11}x_{tx} + H_{21}D_{\Delta_1}x_{tx} + D_{\Delta_2}(H_{12}x_{tx} + H_{22}D_{\Delta_1}x_{tx}). \quad (75)$$

Equation (75) may be rearranged as:

$$y_{rx} = (H_{11} + D_{\Delta_1}H_{21} + D_{\Delta_2}H_{12} + D_{\Delta_1+\Delta_2}H_{22})x_{tx}. \quad (76)$$

Figure 17:
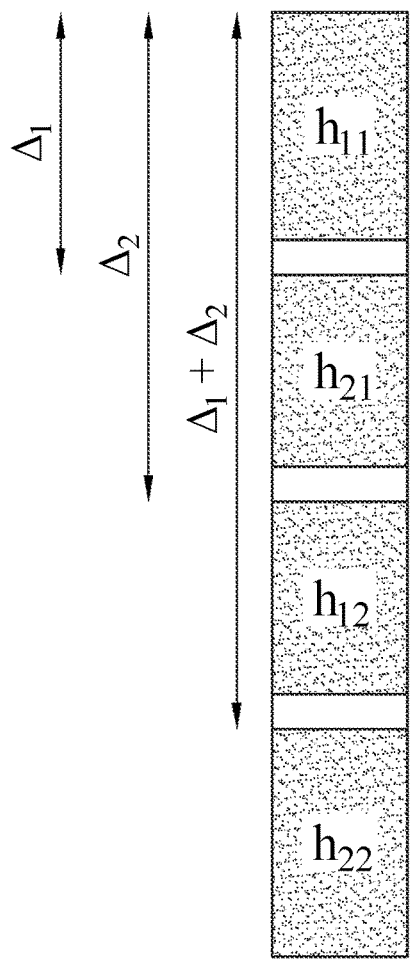
FIG. 17 depicts channel impulse responses of a system, in accordance with various embodiments of the present disclosure.

It is noted that the matrices of equations (75) and (76) are circulant, and circulant matrices are commutative in multiplication. Further, $D_{\Delta_1}$, $D_{\Delta_2} = D_{\Delta_1+\Delta_2}$. Moreover, since multiplication and summation of circulant matrices are also circulant, the summation in the parenthesis on the right-hand side of equation (76) is a circulant matrix. It is further noted that the first column of $y_{rx}$ may be constructed by concatenating the impulse responses between the four pair of antennas in FIG. 16, as shown in FIG. 17, which depicts a concatenation of four channel impulse responses in a 2×2 MIMO system. Depending on the duration and the values of $\Delta_1$ and $\Delta_2$, these impulse responses may overlap or may be separated by a number of zeros.

Figure 18:
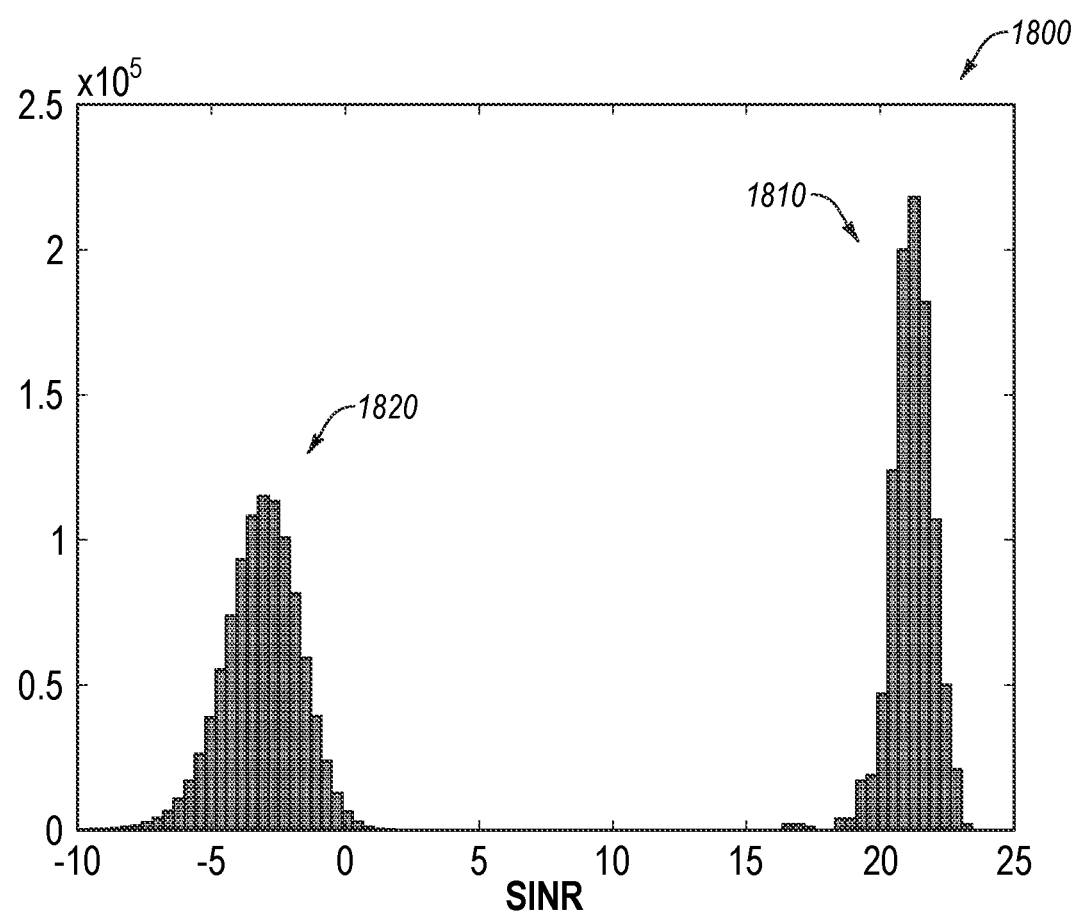
FIG. 18 is a plot depicting histograms of signal-to-noise-plus-interference ratio values at legitimate and eavesdropper detector outputs.

FIG. 18 is a plot 1800 depicting histograms of $10^6$ random values of SINR at detector outputs of a legitimate device (depicted by reference numeral 1810) and an eavesdropper (depicted by reference numeral 1820). In this example, the channel model is based on an exponentially decaying power-delay profile with time constant of 5 samples and a 2×2 MIMO system. Here, in terms of random taps (i.e., channel randomness), the effective channel is similar to the case of a single antenna channel with an exponential power-delay profile with time constant of 20 samples. As expected, the results shown in FIGS. 15A and 18 are very similar.

Figure 19:
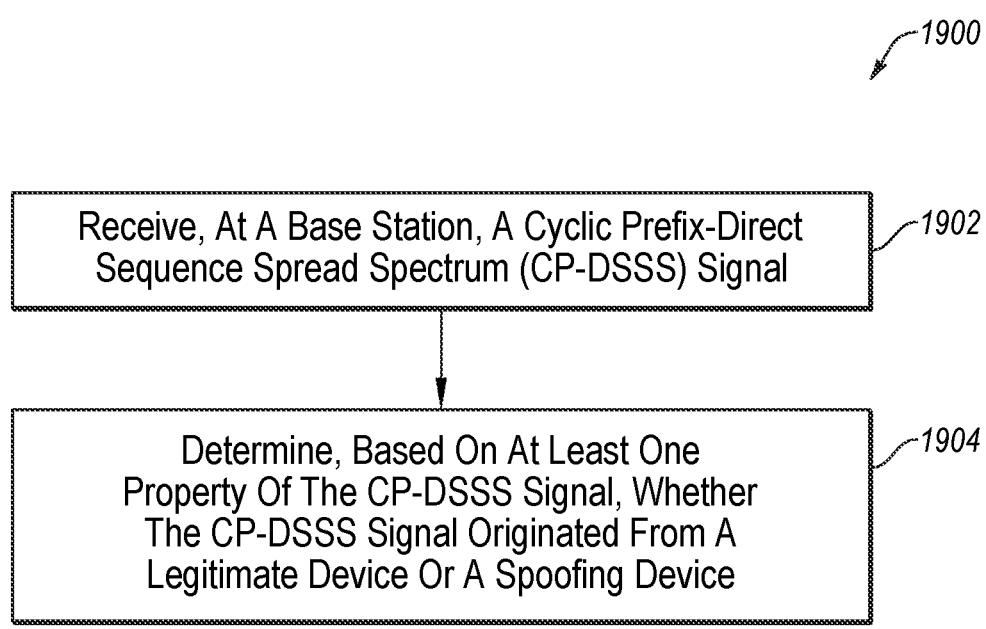
FIG. 19 is a flowchart of an example method of operating a communication device, in accordance with various embodiments of the disclosure.

FIG. 19 is a flowchart of an example method 1900 of operating a communication device, in accordance with various embodiments of the disclosure. Method 1900 may be arranged in accordance with at least one embodiment described in the present disclosure. Method 1900 may be performed, in some embodiments, by a device or system, such as one or more devices of system 100 of FIG. 1, one or more devices of network 700 of FIG. 7, one or more devices of network 800 of FIG. 8, one or more devices of communication system 1100 of FIG. 11, a system 2100 of FIG. 21, or another device or system. Although illustrated as discrete blocks, various blocks may be divided into additional blocks, combined into fewer blocks, or eliminated, depending on the desired implementation.

Method 1900 may begin at block 1902, wherein a CP-DSSS signal may be received at a base station, and method 1900 may proceed to block 1904. For example, the CP-DSSS signal may be received at base station 110 or FGW 106 of FIG. 1, or base station 1102 of FIG. 11.

At block 1904, it may be determined, based on at least one property of the CP-DSSS signal, whether the CP-DSSS signal originated from a legitimate device or a spoofing device. For example, it may be determined (e.g., at a device, such as a base station (e.g., base station 1102)), based on an estimated channel impulse response of the CP-DSSS signal (e.g., in comparison to an estimated channel impulse response of a previously received CP-DSSS signal), whether the CP-DSSS signal originated from a legitimate device (e.g., UE 1104 of FIG. 11) or a spoofing device (e.g., UE 1106 of FIG. 11). As another example, it may be determined whether the CP-DSSS signal originated from a legitimate device or a spoofing device based on a comparison of an amplitude of one or more samples of a matched filter signal level of the CP-DSSS signal to a threshold amplitude. For example, a processor (e.g., processor 2102 of FIG. 21) of the base station may determine whether the CP-DSSS signal originated from a legitimate device or a spoofing device.

Modifications, additions, or omissions may be made to method 1900 without departing from the scope of the present disclosure. For example, the operations of method 1900 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 20:
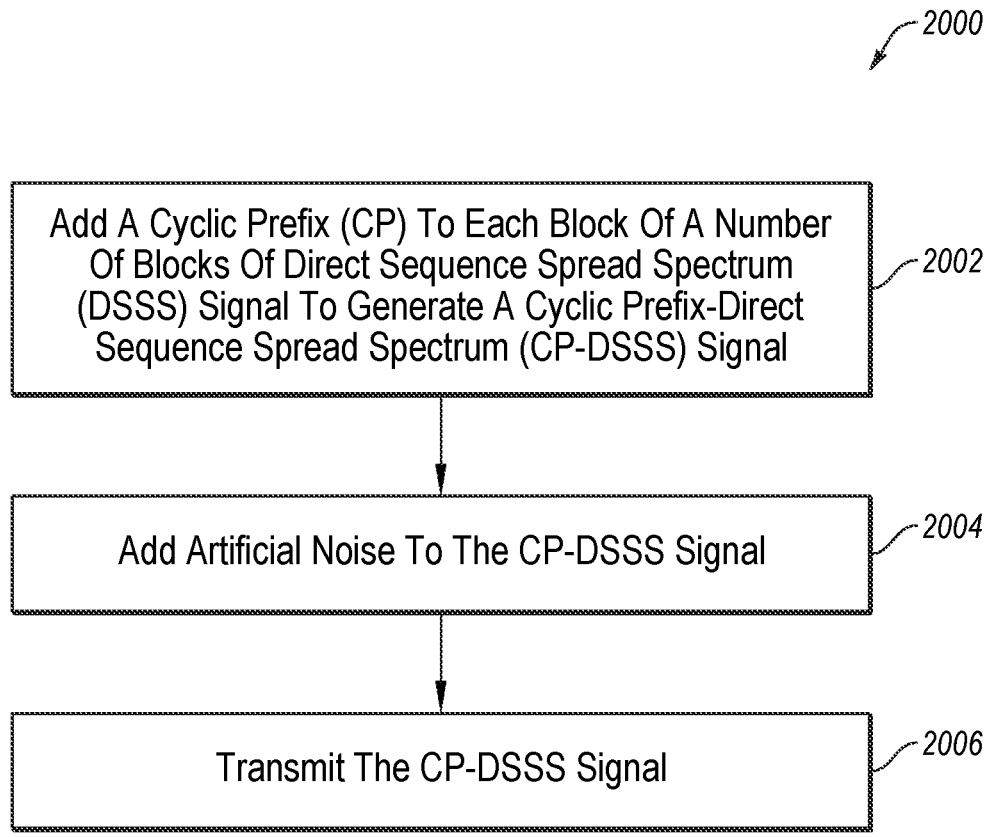
FIG. 20 is a flowchart of another example method of operating a communication device, in accordance with various embodiments of the present disclosure.

FIG. 20 is a flowchart of another example method 2000 of operating a communication device, in accordance with various embodiments of the disclosure. Method 2000 may be arranged in accordance with at least one embodiment described in the present disclosure. Method 2000 may be performed, in some embodiments, by a device or system, such as one or more devices of system 100 of FIG. 1, one or more devices of network 700 of FIG. 7, one or more devices of network 800 of FIG. 8, one or more devices of communication system 1100 of FIG. 11, a system 2100 of FIG. 21, or another device or system. Although illustrated as discrete blocks, various blocks may be divided into additional blocks, combined into fewer blocks, or eliminated, depending on the desired implementation.

Method 2000 may begin at block 2002, wherein a CP may be added to each block of a number of blocks of a DSSS signal to generate a CP-DSSS signal, and method 2000 may proceed to block 2004. For example, a communication device, such as a base station (e.g., base station 1102 of FIG. 11), a user equipment (e.g., UE 1104 of FIG. 11), or a FGW may generate the CP-DSSS signal.

At block 2004, artificial noise may be added to the CP-DSSS signal, and method 2000 may proceed to block 2006. For example, artificial noise may be added to the CP-DSSS signal via adding a vector of samples of white noise to a vector of the CP-DSSS signal. As another example, artificial noise may be added to the CP-DSSS signal such that the artificial noise is orthogonal to data symbols of the CP-DSSS signal and/or data symbols of the CP-DSSS signal recovered at a receiver (e.g., a receiver of UE 1104 of FIG. 11) are substantially free of inter-symbol interference (ISI). For example, a processor (e.g., processor 2102 of FIG. 21) (e.g., of a base station (e.g., base station 1102 of FIG. 11) or a user equipment (e.g., UE 1104 of FIG. 11)) may add the artificial noise to the CP-DSSS signal.

At block 2006, the CP-DSSS signal may be transmitted. For example, the CP-DSSS signal may be transmitted via a base station (e.g., base station 1102 of FIG. 11), a user equipment (e.g., UE 1104 of FIG. 11), or a FGW.

Modifications, additions, or omissions may be made to method 2000 without departing from the scope of the present disclosure. For example, the operations of method 2000 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 21:
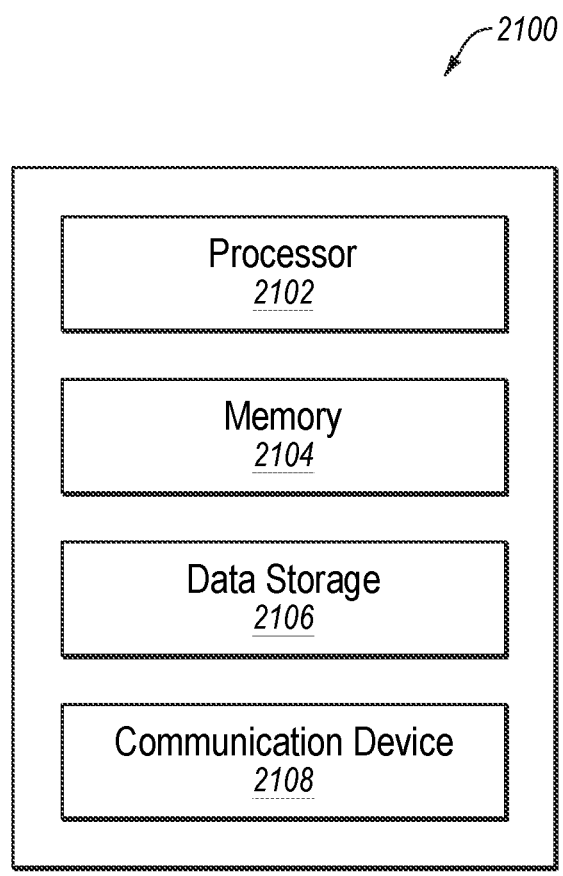
FIG. 21 illustrates an example system which may be configured to operate according to one or more embodiments of the present disclosure.

FIG. 21 is a block diagram of an example system 2100, which may be configured according to at least one embodiment described in the present disclosure. As illustrated in FIG. 21, system 2100 may include a processor 2102, a memory 2104, a data storage 2106, and a communication unit 2108. One or more of base station 110, fUE 108, FGW 106 (see FIG. 1), base station 1102, and/or UE 1104 of FIG. 11, or parts thereof, may be or include an instance of system 2100.

Generally, processor 2102 may include any suitable special-purpose or general-purpose computer, computing entity, or processing device including various computer hardware or software modules and may be configured to execute instructions stored on any applicable computer-readable storage media. For example, processor 2102 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 21, it is understood that processor 2102 may include any number of processors. In some embodiments, processor 2102 may interpret and/or execute program instructions and/or process data stored in memory 2104, data storage 2106, or memory 2104 and data storage 2106. In some embodiments, processor 2102 may fetch program instructions from data storage 2106 and load the program instructions in memory 2104. After the program instructions are loaded into memory 2104, processor 2102 may execute the program instructions, such as instructions to perform one or more operations described in the present disclosure.

Memory 2104 and data storage 2106 may include computer-readable storage media or one or more computer-readable storage mediums for carrying or having computer-executable instructions or data structures stored thereon.

Such computer-readable storage media may be any available media that may be accessed by a general-purpose or special-purpose computer, such as processor 2102. By way of example, and not limitation, such computer-readable storage media may include non-transitory computer-readable storage media including Random Access Memory (RAM), Read-Only Memory (ROM), Electrically Erasable Programmable Read-Only Memory (EEPROM), magnetic disk storage or other magnetic storage devices, flash memory devices (e.g., solid state memory devices), or any other storage medium which may be used to carry or store program code in the form of computer-executable instructions or data structures and which may be accessed by a general-purpose or special-purpose computer. Computer-executable instructions may include, for example, instructions and data configured to cause processor 2102 to perform a certain operation or group of operations e.g., related to embodiments disclosed herein.

Communication unit 2108 may be configured to provide for communications with other devices (e.g., fUEs or a FGW). For example, communication unit 2108 may be configured to transmit to and receive signals according to various embodiments disclosed herein. Communication unit 2108 may include suitable components for communications including, as non-limiting examples, a radio, one or more antennas, one or more encoders and decoders, and/or a power supply.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention. Further, embodiments of the disclosure have utility with different and various detector types and configurations.

What is claimed is:

1. A communication system, comprising:
    a base station configured to:
        add a cyclic prefix (CP) to each block of a number of blocks of a first direct sequence spread spectrum (DSSS) signal to generate a first cyclic prefix-direct sequence spread spectrum (CP-DSSS) signal;
        add artificial noise to the first CP-DSSS signal such that the artificial noise is orthogonal to data symbols of the first CP-DSSS signal; and
        transmit, via a channel, the first CP-DSSS signal including the artificial noise; and
    a user equipment configured to receive the first CP-DSSS signal, wherein the base station, the user equipment, or each of the base station and the user equipment, include multiple antennas, wherein an effective channel between the base station and the user equipment is at least partially based on concatenation of various channel impulse responses between different pairs of antennas of the base station and antennas of the user equipment, wherein the various channel impulses responses are concatenated via a circulant matrix $D_{A_1}$ selected such that when the circulant matrix pre-multiplies a transmit signal vector, elements of the transmit signal vector are shifted downward by $\Delta_1$ elements to construct the effective channel.

2. The communication system of claim 1, wherein the base station is configured to add a vector of samples of white noise to a vector of the first CP-DSSS signal.

3. The communication system of claim 1, wherein the artificial noise added to the first CP-DSSS signal is orthogonal to the data symbols of the first CP-DSSS signal received at the user equipment.

4. The communication system of claim 1, wherein, at the user equipment, the artificial noise of the received first CP-DSSS signal is nulled out at sample points including the data symbols.

5. The communication system of claim 1, wherein the artificial noise is transmitted from the base station to the user equipment in a subspace that is orthogonal to a data symbols subspace.

6. The communication system of claim 1, wherein the transmitted first CP-DSSS signal includes samples that are uncorrelated and Gaussian.

7. The communication system of claim 1, wherein the data symbols of the first CP-DSSS signal received at the user equipment are substantially free of inter-symbol interference (ISI).

8. A method, comprising:
    adding, at a base station, a cyclic prefix (CP) to each block of a number of blocks of direct sequence spread spectrum (DSSS) signal to generate a cyclic prefix-direct sequence spread spectrum (CP-DSSS) signal;
    adding, at the base station, artificial noise to the CP-DSSS signal such that the artificial noise is orthogonal to data symbols of the CP-DSSS signal;
    transmitting the CP-DSSS signal including the artificial noise; and
    receiving the CP-DSSS signal at a user equipment, wherein the base station, the user equipment, or each of the base station and the user equipment, include multiple antennas, wherein an effective channel between the base station and the user equipment is at least partially based on concatenation of various channel impulse responses between different pairs of antennas of the user equipment, wherein the various channel impulses responses are concatenated via a circulant matrix $D_{A_1}$ selected such that when the circulant matrix pre-multiplies a transmit signal vector, elements of the transmit signal vector are shifted downward by $\Delta_1$ elements to construct the effective channel.

9. The method of claim 8, wherein transmitting the CP-DSSS signal comprises transmitting the CP-DSSS signal such that, at a receiver, the artificial noise of the CP-DSSS signal is nulled out at sample points including the data symbols.

10. The method of claim 8, wherein transmitting the CP-DSSS signal comprises transmitting the artificial noise in a subspace that is orthogonal to a data symbols subspace.

11. The method of claim 8, wherein transmitting the CP-DSSS signal comprises transmitting the CP-DSSS signal including samples that are uncorrelated and Gaussian.

12. The method of claim 8, wherein adding artificial noise comprises adding a vector of samples of white noise to a vector of the CP-DSSS signal.

13. The method of claim 8, wherein adding artificial noise comprises adding the artificial noise to the CP-DSSS signal such that the data symbols of the CP-DSSS signal recovered at a receiver are substantially free of inter-symbol interference (ISI).

14. A communication system, comprising:
a base station configured to:
- add a cyclic prefix (CP) to each block of a number of blocks of a first direct sequence spread spectrum (DSSS) signal to generate a first cyclic prefix-direct sequence spread spectrum (CP-DSSS) signal;
- add artificial noise to the first CP-DSSS signal; and
- transmit, via a channel, the first CP-DSSS signal including the artificial noise; and a user equipment configured to receive the first CP-DSSS signal, wherein the base station, the user equipment, or each of the base station and the user equipment, include multiple antennas, wherein an effective channel between the base station and the user equipment is at least partially based on concatenation of various channel impulse responses between different pairs of antennas of the base station and antennas of the user equipment, wherein the various channel impulses responses are concatenated via a circulant matrix $D_{\Delta_1}$ selected such that when the circulant matrix pre-multiplies a transmit signal vector, elements of the transmit signal vector are shifted downward by $\Delta_1$ elements to construct the effective channel.

15. The communication system of claim 14, wherein the base station is configured to add a vector of samples of white noise to a vector of the first CP-DSSS signal.

16. The communication system of claim 14, wherein the artificial noise added to the first CP-DSSS signal is orthogonal to data symbols of the first CP-DSSS signal received at the user equipment.

17. The communication system of claim 14, wherein, at the user equipment, the artificial noise of the received first CP-DSSS signal is nulled out at sample points including data symbols.

18. The communication system of claim 14, wherein the artificial noise is transmitted from the base station to the user equipment in a subspace that is orthogonal to a data symbols subspace.

19. The communication system of claim 14, wherein data symbols of the first CP-DSSS signal received at the user equipment are substantially free of inter-symbol interference (ISI).

* * * * *

UNITED STATES PATENT AND TRADEMARK OFFICE
CERTIFICATE OF CORRECTION

PATENT NO. : 12,126,374 B2
APPLICATION NO. : 17/645220
DATED : October 22, 2024
INVENTOR(S) : Arslan J. Majid, Hussein Moradi and Behrouz Farhang Page 1 of 2

It is certified that error appears in the above-identified patent and that said Letters Patent is hereby corrected as shown below:

In the Specification

Column 10, Line 7, change "rand(N, 1));" to --rand(N, 1)));--

Column 14, Line 20, change "$\tilde{y} = \begin{bmatrix} H_1^{(1)} & H_2^{(2)} \\ H_1^{(2)} & H_2^{(2)} \\ \vdots & \vdots \\ H_1^{(M)} & H_2^{(M)} \end{bmatrix} \begin{bmatrix} s_1 \\ s_2 \end{bmatrix} + \tilde{v};$" to --$\tilde{y} = \begin{bmatrix} H_1^{(1)} & H_2^{(1)} \\ H_1^{(2)} & H_2^{(2)} \\ \vdots & \vdots \\ H_1^{(M)} & H_2^{(M)} \end{bmatrix} \begin{bmatrix} s_1 \\ s_2 \end{bmatrix} + \tilde{v};$--

Column 14, Line 49, change "$H = \begin{bmatrix} H_1^{(1)} & H_2^{(2)} \\ H_1^{(2)} & H_2^{(2)} \\ \vdots & \vdots \\ H_1^{(M)} & H_2^{(M)} \end{bmatrix}.$" to --$H = \begin{bmatrix} H_1^{(1)} & H_2^{(1)} \\ H_1^{(2)} & H_2^{(2)} \\ \vdots & \vdots \\ H_1^{(M)} & H_2^{(M)} \end{bmatrix}.$--

Column 17, Line 35, change "$x = \sum_x s_k f_k;$" m --$x = \sum_k s_k f_k;$--

Column 17, Line 51, change "OEDM and Nis the" to --OFDM and N is the--

Column 18, Line 59, change "vector and His a" to --vector and H is a--

Column 19, Line 33, change "$A = E^H H^H H E = \begin{bmatrix} h_0^H h_0 & h_0^H h_L & h_0^H h_{2L} \\ h_L^H h_0 & h_0^H h_0 & h_0^H h_L \\ h_{2L}^H h_0 & h_0^H h_0 & h_0^H h_0 \end{bmatrix}.$" to --$A = E^H H^H H E = \begin{bmatrix} h_0^H h_0 & h_0^H h_L & h_0^H h_{2L} \\ h_L^H h_0 & h_0^H h_0 & h_0^H h_L \\ h_{2L}^H h_0 & h_L^H h_0 & h_0^H h_0 \end{bmatrix}.$--

Column 22, Line 17, change "vector x. If y is" to --vector x. If γ is--

Signed and Sealed this
Seventeenth Day of December, 2024

Derrick Brent
*Acting Director of the United States Patent and Trademark Office*

CERTIFICATE OF CORRECTION (continued)
U.S. Pat. No. 12,126,374 B2

| Column 24, | Line 62, | change "Since $g_0'$ has a" to --Since $g'_0$ has a-- |
| Column 25, | Line 12, | change "Once $g_0'$ is obtained," to --Once $g'_0$ is obtained,-- |
| Column 25, | Line 12, | change "obtained, $g_0'$ may be" to --obtained, $g'_0$ may be-- |
| Column 25, | Line 63, | change "Z and Hare circulant" to --Z and H are circulant-- |
| Column 30, | Line 65, | change "of s), ($\sigma_{v_{B,o}}^2$ is the variance" to --of s), $\sigma_{v_{B,o}}^2$ is the variance-- |
| Column 30, | Line 66, | change "and $\sigma_{v_{E,o}}^2$ is the" to --and $\sigma_{v_{E,o}}^2$ is the-- |